US010601477B2

United States Patent
Abedini et al.

(10) Patent No.: US 10,601,477 B2
(45) Date of Patent: Mar. 24, 2020

(54) INITIAL INTEGRATION OF WIRELESS DEVICES IN AN INTEGRATED ACCESS AND BACKHAUL SYSTEM

(71) Applicant: QUALCOMM Incorporated, San Diego, CA (US)

(72) Inventors: Navid Abedini, Somerset, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/249,751

(22) Filed: Jan. 16, 2019

(65) Prior Publication Data
US 2019/0312619 A1 Oct. 10, 2019

Related U.S. Application Data

(60) Provisional application No. 62/653,501, filed on Apr. 5, 2018.

(51) Int. Cl.
*H04L 5/12* (2006.01)
*H04B 7/06* (2006.01)
(Continued)

(52) U.S. Cl.
CPC .......... *H04B 7/0608* (2013.01); *H04B 7/043* (2013.01); *H04B 17/309* (2015.01);
(Continued)

(58) Field of Classification Search
CPC .. H04B 7/0608; H04B 17/309; H04B 17/382; H04B 7/043; H04W 24/02; H04W 52/36; H04W 74/0833
See application file for complete search history.

(56) References Cited

U.S. PATENT DOCUMENTS

2018/0227899 A1\* 8/2018 Yu ........................ H04B 7/0695
2018/0279284 A1\* 9/2018 Wang ................... H04W 72/044
(Continued)

OTHER PUBLICATIONS

AT & T: "Discussion on IAB node Discovery and Topology/Route Management," 3GPP Draft; R3-181347, 3rd Generation Partnership Project (3GPP), Mobile Competence Centre; 650, Route Des Lucioles; F-06921 Sophia-Antipolis Cedex; France, vol. RAN WG3, No. Athens, Greece; Feb. 26, 2018-Mar. 2, 2018, Feb. 17, 2018, XP051401785, 6 Pages, Retrieved from the Internet: URL: http://www.3gpp.org/ftp/tsg%5Fran/WG3%5Flu/TSGR3/05F99/Docs/ [retrieved on Feb. 17, 2018] Chapters 2 and 2.1; pp. 1-3.
(Continued)

*Primary Examiner* — Dhaval V Patel
(74) *Attorney, Agent, or Firm* — Holland & Hart LLP

(57) ABSTRACT

Methods, systems, and devices for wireless communications are described. In some integrated access and backhaul (IAB) systems, wireless devices may join the system through an initial integration procedure. For example, a base station may power up and detect a reference signal transmitted by a neighboring base station, and may establish a first beam pair link with this base station. In many cases, this first beam pair link may be a relatively "weak" beam pair link according to an associated quality metric. To improve the link, the integrating base station may transmit an indication of a characteristic (e.g., location or categorical information) of the integrating base station over the first beam pair link, and both base stations may perform beam training based on this characteristic. The base stations may establish a second beam pair link with a greater quality metric than the first beam pair link using this beam training.

30 Claims, 16 Drawing Sheets

(51) Int. Cl.
  *H04B 7/0426* (2017.01)
  *H04W 52/36* (2009.01)
  *H04W 74/08* (2009.01)
  *H04B 17/382* (2015.01)
  *H04W 24/02* (2009.01)
  *H04B 17/309* (2015.01)

(52) U.S. Cl.
  CPC .......... *H04B 17/382* (2015.01); *H04W 24/02* (2013.01); *H04W 52/36* (2013.01); *H04W 74/0833* (2013.01)

(56) References Cited

U.S. PATENT DOCUMENTS

| | | | |
|---|---|---|---|
| 2018/0279286 A1* | 9/2018 | Akoum | H04W 74/0833 |
| 2019/0068263 A1* | 2/2019 | Yu | H04B 7/0617 |
| 2019/0081672 A1* | 3/2019 | Hwang | H04B 7/0617 |

OTHER PUBLICATIONS

Ericsson: "Lower Power Class UE for LTE-MTC," 3GPP Draft; R2-1803066—Lower Power Class UE, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 26, 2018-Mar. 2, 2018, Feb. 16, 2018, XP051400371, 14 Pages, Retrieved from the Internet: URL: http://www.3gpp.org/ftp/tsg%5Fran/WG2%5FRL2/TSGR2%5F101/Docs/ [retrieved on Feb. 16, 2018] chapter 2.3; p. 4.
Guangdong Oppo Mobile Telecom: "NR 4-step Random Access Procedure," 3GPP Draft; R1-1707694, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2015, May 14, 2017, XP051272900, 5 pages, Retrieved from the Internet: URL: http://www.3gpp.org/ftp/Meetings_3GPP_SYNC/RAN1/Docs/ [retrieved on May 14, 2017] Chapters 2.1, 2.5 and 2.6, pp. 2-5.
Partial International Search Report—PCT/US2019/017903—ISA/EPO—dated May 16, 2019.
Samsung: "Random Access Procedure in NR", 3GPP TSG-RAN WG2 Meeting #94, 3GPP Draft; R2-163372_Random_Access Procedure in NR, 3rd Generation Partnership Project (3GPP), Mobile Competence Centre; 650, Route Des Lucioles; F-06921 Sophia-Antipolis Cedex; France, vol. RAN WG2, No. Nanjing, China; May 23, 2016-May 27, 2016, May 22, 2016, XP051104903, 7 Pages, Retrieved from the Internet: URL: http://www.3gpp.org/ftp/Meetings_3GPP_SYNC/RAN2/Docs/ [retrieved on May 22, 2016] pp. 1-4, Figures 1, 4.
CATT: "NR Power Control Aspects", 3GPP Draft; R1-1717846, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Oct. 8, 2017, XP051341030, 7 Pages, Retrieved from the Internet: URL: http://www.3gpp.org/ftp/Meetings_3GPP_SYNC/RAN1/Docs/ [retrieved on Oct. 8, 2017] p. 5-p. 6.
Ericsson: "Providing SIB1-BR via Dedicated RRC Signalling", 3GPP Draft; 36300_CR0979_(REL-14)_R2-1702120, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017, Mar. 18, 2018, XP051507924, 3 pages, Retrieved from the Internet: URL: http://www.3gpp.org/ftp/tsg%5Fran/TSG%5FRAN/TSGR%5F75/Docs/RP%2D170652%2Ezip [retrieved on Mar. 18, 2018] p. 3.
International Search Report and Written Opinion—PCT/US2019/017903—ISA/EPO—dated Oct. 14, 2019.
Samsung Electronics: "pCR 45.820 NB-CIoT-Grant-Free Multiple Access for Uplink", 3GPP Draft; GPC150523 PCR 45.820 NB-CIOT-Grant-Free Multiple Access for Uplink Transmission (Revision of GPC150514), 3rd Generation Partnership Project (3GPP), Mobile Competence Centre; 650, Route, vol. TSG GERAN, No. Kista, Sweden; Jun. 29, 2015-Jul. 2, 2015, Jun. 29, 2015, XP051614218, 11 pages, Retrieved from the Internet: URL: http://www. http://www [retrieved on Jun. 29, 2015] p. 10.

* cited by examiner

INITIAL INTEGRATION OF WIRELESS DEVICES IN AN INTEGRATED ACCESS AND BACKHAUL SYSTEM

The present application for patent claims benefit of U.S. Provisional Patent Application No. 62/653,501 by ABEDINI et al., entitled "INITIAL INTEGRATION OF WIRELESS DEVICES IN AN INTEGRATED ACCESS AND BACKHAUL SYSTEM," filed Apr. 5, 2018, assigned to the assignee hereof, and expressly incorporated by reference in its entirety.

BACKGROUND

The following relates generally to wireless communications, and more specifically to initial integration of wireless devices in an integrated access and backhaul (IAB) system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

Some wireless communications systems may support IAB systems, where base stations may communicate with both UEs using access networks and other base stations using backhaul networks. Some devices in the IAB system may be relay devices, and may forward messages or signals between wireless devices to extend the service area provided by base stations in the system. In some cases, these relay devices may be examples of relay base stations. When a relay device is initially installed and powers up, the relay device may not be aware of the neighboring devices, base stations, or cells associated with the IAB system. Accordingly, the relay device may not be able to efficiently establish reliable connections (e.g., backhaul links) with neighboring base stations when joining the IAB system.

SUMMARY

The described techniques relate to improved methods, systems, devices, or apparatuses that support initial integration of wireless devices in an integrated access and backhaul (IAB) system. Generally, the described techniques provide for wireless devices to join an IAB system with a reliable beam pair link. For example, a base station may power up and search for neighboring base stations that are part of the IAB system. The integrating base station may detect a reference signal (e.g., a synchronization signal block (SSB)) transmitted by a neighboring base station, and may establish a first beam pair link with this base station. In many cases, this first beam pair link may be a relatively "weak" beam pair link according to an associated quality metric. To improve the link, the integrating base station may transmit an indication of a characteristic (e.g., location information, categorical information corresponding to certain integration capabilities, etc.) of the integrating base station over the first beam pair link, and both base stations may perform beam training based at least in part on this characteristic. This indication may be sent in a random access (RACH) preamble message, in a device identification message (e.g., a RACH Message 3 (Msg3)), or in special signaling. The base stations may establish a second beam pair link with a greater quality metric than the first beam pair link based at least in part on this beam training, and may utilize this second beam pair link for backhaul communications in the IAB system. In some cases, the functions performed by the base stations as described above may instead be performed by other types of wireless devices, such as user equipments (UEs).

A method of wireless communications at a first wireless device is described. The method may include transmitting, from the first wireless device to a second wireless device in a beamformed transmission using a first beam pair link associated with a first quality level, an indication of a characteristic of the first wireless device, performing beam training based at least in part on the characteristic of the first wireless device, and establishing, with the second wireless device, a second beam pair link associated with a second quality level greater than the first quality level based at least in part on the beam training.

An apparatus for wireless communications at a first wireless device is described. The apparatus may include means for transmitting, from the first wireless device to a second wireless device in a beamformed transmission using a first beam pair link associated with a first quality level, an indication of a characteristic of the first wireless device, means for performing beam training based at least in part on the characteristic of the first wireless device, and means for establishing, with the second wireless device, a second beam pair link associated with a second quality level greater than the first quality level based at least in part on the beam training.

Another apparatus for wireless communications at a first wireless device is described. The apparatus may include a processor, memory in electronic communication with the processor, and instructions stored in the memory. The instructions may be operable to cause the processor to transmit, from the first wireless device to a second wireless device in a beamformed transmission using a first beam pair link associated with a first quality level, an indication of a characteristic of the first wireless device, perform beam training based at least in part on the characteristic of the first wireless device, and establish, with the second wireless device, a second beam pair link associated with a second quality level greater than the first quality level based at least in part on the beam training.

A non-transitory computer-readable medium for wireless communications at a first wireless device is described. The non-transitory computer-readable medium may include instructions operable to cause a processor to transmit, from the first wireless device to a second wireless device in a beamformed transmission using a first beam pair link associated with a first quality level, an indication of a characteristic of the first wireless device, perform beam training based at least in part on the characteristic of the first wireless device, and establish, with the second wireless device, a second beam pair link associated with a second quality level greater than the first quality level based at least in part on the beam training.

Some examples of the method, apparatus, and non-transitory computer-readable medium described above may further include processes, features, means, or instructions for receiving an SSB from the second wireless device. Some examples of the method, apparatus, and non-transitory computer-readable medium described above may further include processes, features, means, or instructions for establishing the first beam pair link based at least in part on the SSB.

In some examples of the method, apparatus, and non-transitory computer-readable medium described above, receiving the SSB comprises receiving the SSB in at least one beam during a reception beam-sweeping procedure.

In some examples of the method, apparatus, and non-transitory computer-readable medium described above, the SSB may be received according to a first reference signal received power (RSRP) threshold that may be less than a second RSRP threshold associated with a UE.

In some examples of the method, apparatus, and non-transitory computer-readable medium described above, the first RSRP threshold may be configured based at least in part on the second RSRP threshold and a conversion value or may be configured to a default value independent of the second RSRP threshold. In some examples of the method, apparatus, and non-transitory computer-readable medium described above, the default value may be equal to zero. Some examples of the method, apparatus, and non-transitory computer-readable medium described above may further include processes, features, means, or instructions for configuring the first RSRP threshold according to a received master information block (MIB), system information block (SIB), remaining minimum system information (RMSI), other system information (OSI), non-standalone (NSA) message, or a combination thereof.

Some examples of the method, apparatus, and non-transitory computer-readable medium described above may further include processes, features, means, or instructions for transmitting a RACH preamble message over the first beam pair link.

In some examples of the method, apparatus, and non-transitory computer-readable medium described above, the RACH preamble message comprises the indication of the characteristic of the first wireless device. Some examples of the method, apparatus, and non-transitory computer-readable medium described above may further include processes, features, means, or instructions for selecting a RACH preamble sequence or resources for the RACH preamble message based at least in part on the characteristic of the first wireless device.

Some examples of the method, apparatus, and non-transitory computer-readable medium described above may further include processes, features, means, or instructions for transmitting one or more RACH preamble message retransmissions according to a first maximum RACH preamble transmission threshold that may be greater than a second maximum RACH preamble transmission threshold associated with a UE.

In some examples of the method, apparatus, and non-transitory computer-readable medium described above, the first maximum RACH preamble transmission threshold may be configured based at least in part on the second maximum RACH preamble transmission threshold and a conversion value or may be configured to a default value independent of the second maximum RACH preamble transmission threshold. Some examples of the method, apparatus, and non-transitory computer-readable medium described above may further include processes, features, means, or instructions for configuring the first maximum RACH preamble transmission threshold according to a received MIB, SIB, RMSI, OSI, NSA message, or a combination thereof.

Some examples of the method, apparatus, and non-transitory computer-readable medium described above may further include processes, features, means, or instructions for performing power ramping for the one or more RACH preamble message retransmissions, wherein a first power ramping step for the power ramping may be greater than a second power ramping step associated with the UE.

In some examples of the method, apparatus, and non-transitory computer-readable medium described above, the RACH preamble message may be transmitted according to a first target received power threshold that may be greater than a second target received power threshold associated with a UE.

In some examples of the method, apparatus, and non-transitory computer-readable medium described above, transmitting the indication of the characteristic of the first wireless device comprises transmitting a device identification message comprising the indication of the characteristic of the first wireless device. In some examples of the method, apparatus, and non-transitory computer-readable medium described above, the device identification message comprises a RACH Msg3 transmission.

In some examples of the method, apparatus, and non-transitory computer-readable medium described above, the characteristic of the first wireless device comprises a physical location of the first wireless device, an elevation of the first wireless device, a global positioning system (GPS) location of the first wireless device, or a combination thereof. In some examples of the method, apparatus, and non-transitory computer-readable medium described above, the characteristic of the first wireless device comprises a class or category of the first wireless device corresponding to integration capabilities of the first wireless device.

In some examples of the method, apparatus, and non-transitory computer-readable medium described above, the first quality level corresponds to a first RSRP metric. In some examples of the method, apparatus, and non-transitory computer-readable medium described above, the second quality level corresponds to a second RSRP metric greater than the first RSRP metric.

In some examples of the method, apparatus, and non-transitory computer-readable medium described above, the second beam pair link comprises narrower beams than the first beam pair link.

In some examples of the method, apparatus, and non-transitory computer-readable medium described above, transmitting the indication of the characteristic of the first wireless device comprises transmitting a layer one (L1) reference signal, a medium access control (MAC) channel element (MAC-CE), a radio resource control (RRC) message, an upper-layer message, or a combination thereof comprising the indication of the characteristic of the first wireless device.

In some examples of the method, apparatus, and non-transitory computer-readable medium described above, the first wireless device comprises a relay base station. In some examples of the method, apparatus, and non-transitory computer-readable medium described above, the second wireless device comprises a donor base station or a different relay base station.

An additional method of wireless communications at a first wireless device is described. The method may include receiving, from a second wireless device in a beamformed transmission over a first beam pair link associated with a first quality level, an indication of a characteristic of the second wireless device, performing beam training based at least in part on the characteristic of the second wireless device, and establishing, with the second wireless device, a second beam pair link associated with a second quality level greater than the first quality level based at least in part on the beam training.

An apparatus for wireless communications at a first wireless device is described. The apparatus may include means for receiving, from a second wireless device in a beamformed transmission over a first beam pair link associated with a first quality level, an indication of a characteristic of the second wireless device, means for performing beam training based at least in part on the characteristic of the second wireless device, and means for establishing, with the second wireless device, a second beam pair link associated with a second quality level greater than the first quality level based at least in part on the beam training.

Another apparatus for wireless communications at a first wireless device is described. The apparatus may include a processor, memory in electronic communication with the processor, and instructions stored in the memory. The instructions may be operable to cause the processor to receive, from a second wireless device in a beamformed transmission over a first beam pair link associated with a first quality level, an indication of a characteristic of the second wireless device, perform beam training based at least in part on the characteristic of the second wireless device, and establish, with the second wireless device, a second beam pair link associated with a second quality level greater than the first quality level based at least in part on the beam training.

A non-transitory computer-readable medium for wireless communications at a first wireless device is described. The non-transitory computer-readable medium may include instructions operable to cause a processor to receive, from a second wireless device in a beamformed transmission over a first beam pair link associated with a first quality level, an indication of a characteristic of the second wireless device, perform beam training based at least in part on the characteristic of the second wireless device, and establish, with the second wireless device, a second beam pair link associated with a second quality level greater than the first quality level based at least in part on the beam training.

Some examples of the method, apparatus, and non-transitory computer-readable medium described above may further include processes, features, means, or instructions for transmitting an SSB. Some examples of the method, apparatus, and non-transitory computer-readable medium described above may further include processes, features, means, or instructions for establishing the first beam pair link based at least in part on the SSB.

In some examples of the method, apparatus, and non-transitory computer-readable medium described above, transmitting the SSB comprises transmitting a plurality of SSBs, wherein each SSB of the plurality of SSBs may be transmitted on a different beam in a transmission beam-sweeping procedure. In some examples of the method, apparatus, and non-transitory computer-readable medium described above, the transmission beam-sweeping procedure for the second wireless device comprises a first set of beams different than a second set of beams associated with a transmission beam-sweeping procedure for UE access.

Some examples of the method, apparatus, and non-transitory computer-readable medium described above may further include processes, features, means, or instructions for receiving a RACH preamble message over the first beam pair link, wherein the RACH preamble message comprises the indication of the characteristic of the second wireless device.

Some examples of the method, apparatus, and non-transitory computer-readable medium described above may further include processes, features, means, or instructions for receiving a device identification message over the first beam pair link, wherein the device identification message comprises the indication of the characteristic of the second wireless device. In some examples of the method, apparatus, and non-transitory computer-readable medium described above, the device identification message comprises a RACH Msg3 transmission.

In some examples of the method, apparatus, and non-transitory computer-readable medium described above, the characteristic of the second wireless device comprises a physical location of the second wireless device, an elevation of the second wireless device, a GPS location of the second wireless device, or a combination thereof. In some examples of the method, apparatus, and non-transitory computer-readable medium described above, the characteristic of the second wireless device comprises a class or category of the second wireless device corresponding to integration capabilities of the second wireless device.

In some examples of the method, apparatus, and non-transitory computer-readable medium described above, the first quality level corresponds to a first RSRP metric. In some examples of the method, apparatus, and non-transitory computer-readable medium described above, the second quality level corresponds to a second RSRP metric greater than the first RSRP metric.

In some examples of the method, apparatus, and non-transitory computer-readable medium described above, the second beam pair link comprises narrower beams than the first beam pair link.

Some examples of the method, apparatus, and non-transitory computer-readable medium described above may further include processes, features, means, or instructions for receiving an L1 reference signal, a MAC-CE, an RRC message, an upper-layer message, or a combination thereof comprising the indication of the characteristic of the second wireless device.

In some examples of the method, apparatus, and non-transitory computer-readable medium described above, the first wireless device comprises a donor base station or a relay base station. In some examples of the method, apparatus, and non-transitory computer-readable medium described above, the second wireless device comprises a different relay base station.

DETAILED DESCRIPTION

Figure 1:
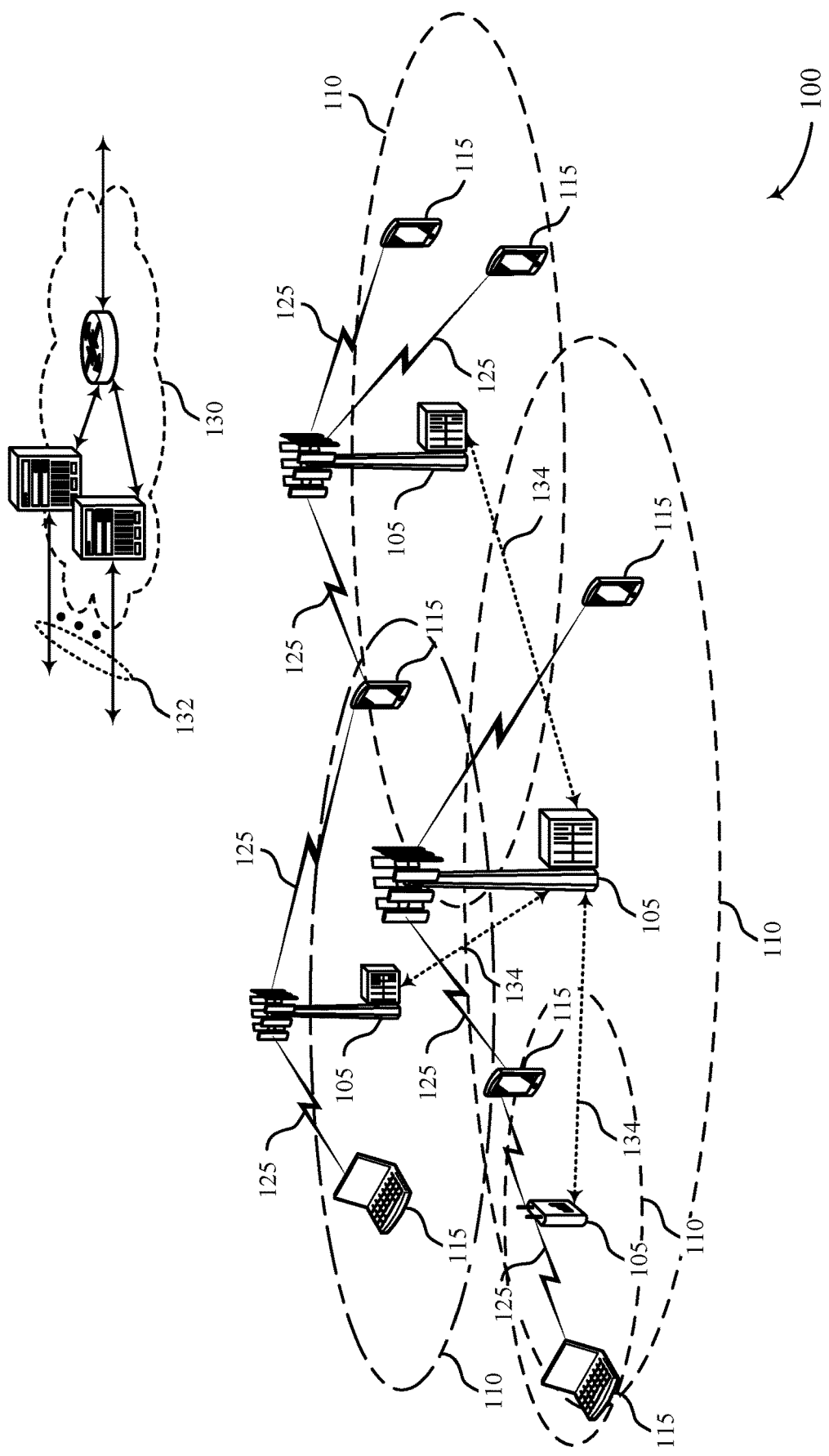
FIGS. 1 and 2 illustrate examples of wireless communications systems that support initial integration of wireless devices in integrated access and backhaul (IAB) systems in accordance with aspects of the present disclosure.

Some wireless communications systems (e.g., New Radio (NR) systems, millimeter wave (mmW) systems, etc.) may include integrated access and backhaul (IAB) networks. In an IAB system, base stations may communicate with user equipments (UEs) over access networks and with other base stations over backhaul networks. An IAB system may include donor base stations (e.g., base stations connected to a base station centralized unit (CU) via a wireline backhaul) and relay base stations (e.g., base stations wirelessly connected to other relay base stations and/or donor base stations for relaying communications). In some cases, these relay base stations may be examples of low-cost or low-complexity wireless devices.

Additional wireless devices may connect to the IAB network using an initial integration process. For example, a base station may power up and search for neighboring base stations currently connected to the IAB system. The base station may perform a reception beam-sweeping process to detect any reference signals (e.g., synchronization signal blocks (SSBs)) transmitted by neighboring base stations. In some cases, the integrating base station may be an example of a relay base station, and a neighboring base station may be an example of a donor base station or a different relay base station. In other cases, this integration process may be performed by other types of wireless devices (e.g., UEs, Internet of Things (IoT) devices, etc.) other than base stations.

A neighboring base station may transmit SSBs in a transmission beam-sweeping procedure. In some cases, these may be downlink SSBs transmitted for UE access. The integrating base station may detect one or more of the SSBs on a receive beam, and may establish an initial beam pair link with the neighboring base station. In some cases, this beam pair link is associated with a relatively low quality level (e.g., due to the directions or widths of the beams in the beam pair link). To improve this initial beam pair link, the integrating base station may transmit an indication of a characteristic of the integrating base station to the neighboring base station. This characteristic may relate to location information of the integrating base station, categorical information corresponding to specific capabilities of the integrating base station, or may indicate that the integrating base station is a relay device. The integrating base station may indicate the characteristic with a random access (RACH) preamble message, a device identification message (e.g., a RACH Message 3 (Msg3)), special signaling, or some combination of these. The neighboring base station may receive the indication, and both base stations may perform beam training for the beam pair link based on the characteristic. The base stations may establish an updated beam pair link based on the beam training, where the updated link is associated with a greater quality level than the initial beam pair link. This updated beam pair link may be used for backhaul communications between the base stations in the IAB system.

Aspects of the disclosure are initially described in the context of wireless communications systems. Additional aspects of the disclosure are described with respect to an IAB system and a process flow. Aspects of the disclosure are further illustrated by and described with reference to apparatus diagrams, system diagrams, and flowcharts that relate to initial integration of wireless devices in an IAB system.

FIG. 1 illustrates an example of a wireless communications system 100 that support initial integration of wireless devices in an IAB system in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low-latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an IoT device, an Internet of Everything (IoE) device, or an MTC device, or the like, which may be implemented in various articles such as appliances, vehicles, meters, or the like.

Some UEs 115, such as MTC or IoT devices, may be low-cost or low-complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency-division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Some wireless communications systems 100 may be examples of IAB systems. In an IAB system, base stations 105 may communicate with UEs 115 over access networks and with other base stations 105 over backhaul networks. An IAB system may include donor base stations (e.g., base stations 105 connected to a base station CU via a wireline backhaul) and relay base stations (e.g., base stations 105 wirelessly connected to other relay base stations and/or donor base stations for relaying communications). In some cases, these relay base stations may be examples of low-cost or low-complexity wireless devices.

Additional wireless devices may join the IAB system using an initial integration process. For example, a base station 105 may power up and search for neighboring base stations 105 connected to the IAB system. The base station 105 may perform a reception beam-sweeping process to detect any reference signals (e.g., SSBs) transmitted by neighboring base stations 105. In some cases, the integrating base station 105 may be an example of a relay base station, and a neighboring base station 105 may be an example of a donor base station or a different relay base station. In other cases, this integration process may be performed by other types of wireless devices (e.g., UEs 115, IoT devices, etc.) other than base stations 105.

A neighboring base station 105 may transmit SSBs in a transmission beam-sweeping procedure. In some cases, these may be downlink SSBs transmitted for UE 115 access. The integrating base station 105 may detect one or more of the SSBs on a receive beam, and may establish an initial beam pair link with the neighboring base station 105. In some cases, this beam pair link is associated with a relatively low quality level (e.g., due to the directions or widths of the beams in the beam pair link). To improve this initial beam pair link, the integrating base station 105 may transmit an indication of a characteristic of the integrating base station 105 to the neighboring base station 105. This characteristic may relate to location information of the integrating base station 105, categorical information corresponding to specific capabilities of the integrating base station 105, or may indicate that the integrating base station 105 is a relay device. The integrating base station 105 may indicate the characteristic with a RACH preamble message, a device identification message (e.g., a RACH Msg3), or special signaling. The neighboring base station 105 may receive the indication, and both base stations 105 may perform beam training for the beam pair link based on the characteristic. The base stations 105 may then establish an updated beam pair link based on the beam training, where the updated link is associated with a greater quality level than the initial beam pair link.

Figure 2:
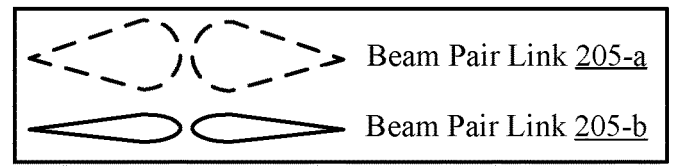
Figure 2:
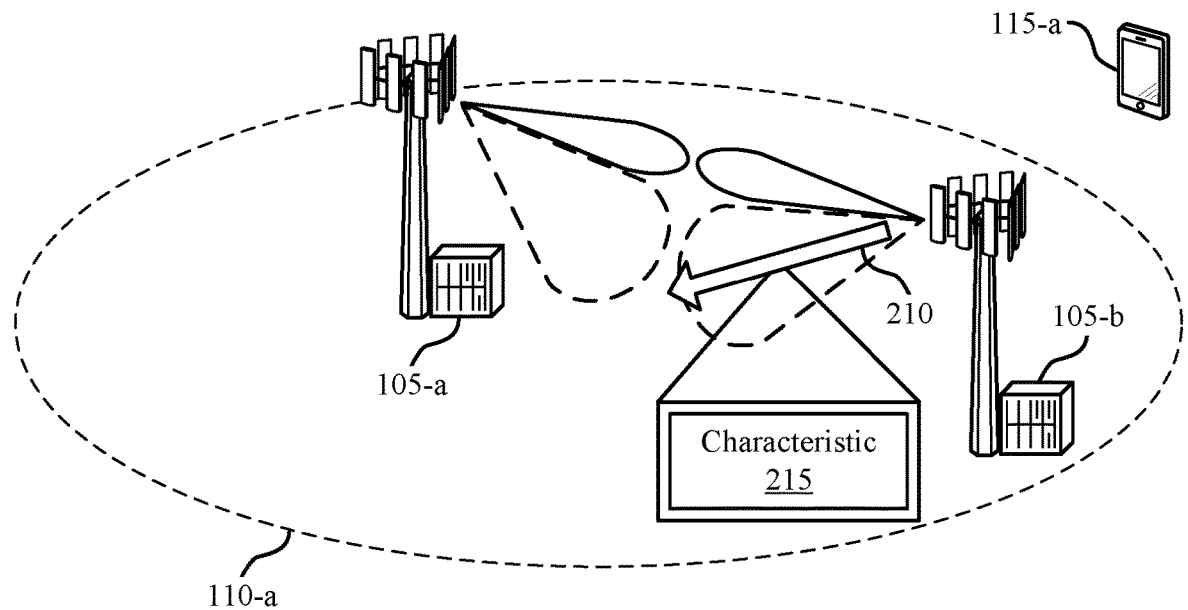

FIG. 2 illustrates an example of a wireless communications system 200 that supports initial integration of wireless devices in an IAB system in accordance with aspects of the present disclosure. The wireless communications system 200 (e.g., an NR system, an LTE system, a mmW system, etc.) may be an example of an IAB system, supporting both access networks (e.g., between UEs 115 and base stations 105) and backhaul networks (e.g., between different base stations 105). These access and backhaul networks may use the same wireless technology (e.g., NR technologies) and may share common resources. The wireless communications system 200 may include base stations 105-a and 105-b and UE 115-a, which may be examples of the corresponding devices described with reference to FIG. 1.

As described, base station 105-a may be integrated within an IAB system (e.g., as a donor base station connected to a base station CU, or as a relay base station), while base station 105-b may perform an integration process to join the IAB system. For example, base station 105-a may provide network coverage for a geographic coverage area 110-a. If a UE 115—such as UE 115-a—is located outside geographic coverage area 110-a and if base station 105-b is integrated into the IAB system, base station 105-a may utilize base station 105-b as a relay device in order to serve UE 115-a outside the geographic coverage area 110-a. Base station 105-a and base station 105-b may communicate using backhaul procedures, and UE 115-a and base station 105-b may communicate using access procedures. In some cases, relay devices (e.g., relay base stations 105) may be designed with low cost and complexity. Wireless multi-hop backhaul systems may implement multiple relay devices (e.g., base stations 105, UEs 115, etc.) to further extend the wireless access support provided by a base station 105.

Base station 105-b may perform an initial integration procedure to establish a backhaul connection to the IAB system. This initial integration procedure may be similar to an initial acquisition procedure for a UE 115. Base station 105-b (e.g., in a stand-alone mode) may power up and search for neighboring base stations 105. If base station 105-b identifies a neighboring base station 105 (e.g., a donor or relay, such as base station 105-a), base station 105-b may establish a backhaul connection with the identified base station 105. Base station 105-b may identify neighboring base stations 105 based on detecting one or more reference signals from the neighboring base stations 105, such as SSBs. Base station 105-a may periodically or aperiodically transmit SSBs or other reference signals for UE 115 access procedures, relay device integrations, or both. Base station 105-a may transmit these signals using a number of transmit beams (e.g., in a beam-sweeping procedure). While UEs 115 may utilize these signals for initial access, base station 105-b may utilize these signals to perform initial backhaul integration.

Upon receiving a reference signal, base station 105-b may establish a beam pair link 205-a with base station 105-a (i.e., the base station that transmitted the reference signal). In some cases, this beam pair link 205-a may be referred to as a "weak" beam pair link 205-a, and may not be suitable for further communications due to a relatively poor quality metric. Rather than continue to use this initial beam pair link 205-a, base station 105-a and base station 105-b may perform beam training or beam refinement procedures to improve the quality of the beam pair link 205-a.

To aid in this beam training, base station 105-b may transmit a signal 210 including an indication of a characteristic 215 of base station 105-b. This characteristic 215 may include a location of base station 105-b (e.g., an elevation level, a global positioning system (GPS) location, etc.), a pre-defined class or category of base station 105-b, or simply an indication that base station 105-b is a relay device. The pre-defined class or category may correspond to specific capabilities of base station 105-b. For example, the class or category may indicate whether base station 105-b is mobile or fixed, whether base station 105-b is an indoor or outdoor relay device, whether base station 105-b is a ground-level relay or a tower relay, or any combination of these or other classes or categories of relays that may indicate direction or beam related information to base station 105-a.

Base station 105-a may receive the indication of the characteristic 215, and may perform beam training in response. For example, base station 105-a may determine a different direction for a beam pair link 205 with base station 105-b. Additionally or alternatively, base station 105-a may utilize a narrower beam for the updated beam pair link 205 based on the characteristic 215. Base station 105-b may also perform beam training to improve the beam pair link 205. For example, base station 105-a may determine a new beam for the beam pair link 205, and base station 105-b may correspondingly determine an updated beam based on the new beam for base station 105-a. These new beams may form an updated beam pair link 205-b. Updated beam pair link 205-b may correspond to a higher quality metric (e.g., a higher reference signal received power (RSRP)) than the initial beam pair link 205-a. Base station 105-a and base station 105-b may utilize the updated beam pair link 205-b for backhaul transmission in the IAB system. For example, if base station 105-a serves UE 115-a using base station 105-b as a relay device, base station 105-a and base station 105-b may communicate over a backhaul link formed by the updated beam pair link 205-b.

While the serving device aiding in the integration described above is a base station 105 (e.g., base station 105-a) and the integrating device is also described as a base station 105 (e.g., base station 105-b), other types of wireless devices may perform the same or similar techniques. For example, the functionality described above with respect to base stations 105-a, 105-b, or both may instead be performed by UEs 115 or other wireless devices in order to integrate any type of wireless device into a wireless system.

Figure 3:
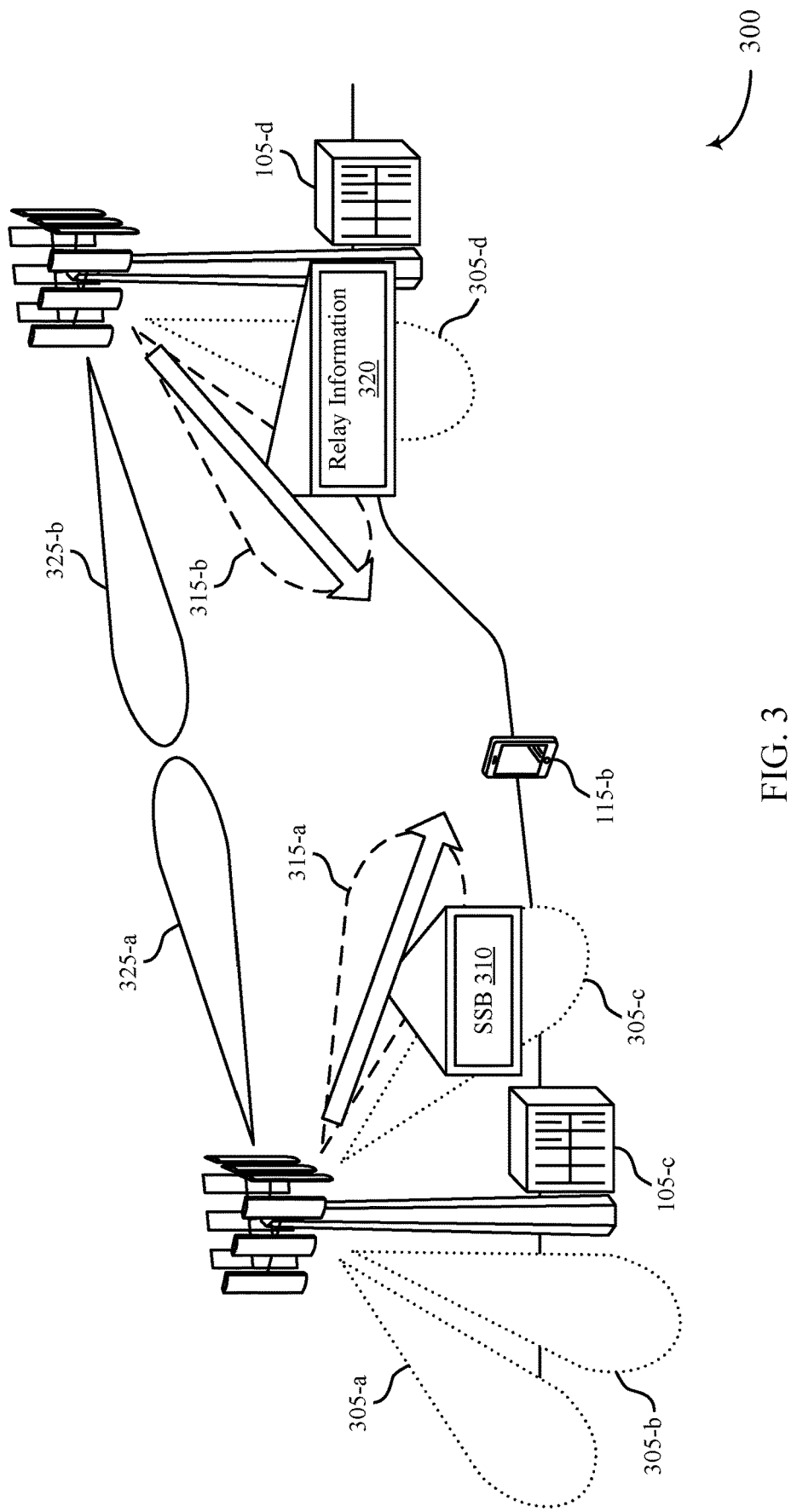
FIG. 3 illustrates an example of an IAB system that supports initial integration of wireless devices in accordance with aspects of the present disclosure.

FIG. 3 illustrates an example of an IAB system 300 that supports initial integration of wireless devices in accordance with aspects of the present disclosure. The IAB system 300 may include base stations 105-c and 105-d and UE 115-b, which may be examples of the corresponding devices described with reference to FIGS. 1 and 2. As illustrated, base station 105-c may be part of the IAB system 300, and may provide access to UE 115-b. Base station 105-d may initially power up and perform integration procedures to join the IAB system 300 (e.g., as a relay device for extended network range). Base station 105-c and base station 105-d may perform beam training to establish a beam pair link between the base stations 105, where the beam pair link may be used for reliable backhaul transmissions. This beam pair link may include beam 325-a for base station 105-c and beam 325-b for base station 105-d. In some cases, beam 325-a may be an example of a transmit beam and beam 325-b may be an example of a receive beam. In other cases, beam 325-a may be a transmit beam and beam 325-b may be a receive beam. In yet other cases, one or both of the beams 325 may be used for both transmission and reception in the beam pair link.

Base station 105-c may transmit reference signals using a transmission beam-sweeping procedure. For example, base station 105-c may repeatedly transmit a reference signal, such as an SSB 310, in a set of beams 305 corresponding to the beam-sweep. These beams may correspond to different beam directions, different beam widths, different resources, or some combination thereof. For example, base station 105-c may transmit an SSB 310 in beam 305-a, beam 305-b, beam 305-c, and beam 315-a during the transmission beam-sweep procedure, corresponding to different beam directions. Performing the beam-sweep may provide reference signals to wireless devices (e.g., UEs 115, base stations 105, or both) in different geographic locations or regions for initial acquisition or integration. As illustrated, UE 115-b may detect the SSB 310 in beam 315-a, and may initiate an access procedure using the SSB 310 to establish a communication link with base station 105-c.

Similarly, base station 105-d may detect the SSB 310 to establish a backhaul link with base station 105-d. For example, upon powering up, base station 105-d may initiate a reception beam-sweeping procedure to search for neighboring base stations 105. The reception beam-sweeping procedure may involve base station 105-d monitoring for signals on a set of receive beams (e.g., beam 305-d and beam 315-b). Base station 105-d may receive the SSB 310 transmitted in beam 315-a over beam 315-b. Accordingly, base station 105-c and base station 105-d may establish a first beam pair link between beams 315-a and 315-b. In some cases, base station 105-d may receive the SSB 310 over multiple beams in the reception beam-sweeping procedure. In these cases, base station 105-d may select the beam receiving the SSB 310 at a greatest quality metric (e.g., RSRP value) or with a quality metric meeting a minimum threshold for establishing the beam pair link. For example, base station 105-d may receive the SSB 310 over beam 305-d and beam 315-b, may compare the reception quality for the SSB 310 over the different beams, and may form a beam pair link with base station 105-c using beam 315-b based on the comparison.

In some cases, to increase the reliability of establishing a first beam pair link with base station 105-c, base station 105-d may implement a different RSRP threshold for detecting an SSB 310 than a UE 115, such as UE 115-b. For example, relay devices may be configured with different (e.g., lower) RSRP thresholds than access devices. This RSRP threshold may indicate the minimum RSRP measurement for detecting an SSB 310—or any similar reference signal—for use as a reference to transmit a RACH preamble message on the corresponding resources. The RSRP threshold for base station 105-d may be based on the RSRP threshold for UE 115-b, or may be independent of the RSRP threshold for UE 115-b. In a first example, the RSRP threshold for base station 105-d may be determined based on applying a conversion value X to the RSRP threshold for UE 115-b. The RSRP threshold for base station 105-d may be X times the RSRP threshold for UE 115-b (e.g., where X is between 0 and 1) or may be X decibels (dBs) less than the RSRP threshold for UE 115-b, where X is a fixed or dynamic value. In a second example, the RSRP threshold for base station 105-d may be set to a default or pre-determined value. The default value may be zero (e.g., effectively removing the RSRP threshold) or a non-zero value (e.g., for implementing an RSRP threshold independent of any RSRP thresholds for other wireless devices). In a third example, different RSRP thresholds may be selected for different transmit beams or different RSRP thresholds may correspond to different transmitted SSBs 310.

After receiving an SSB 310 (e.g., based on the RSRP threshold, as described above), base station 105-d may initiate a RACH procedure. The RACH procedure may involve base station 105-d transmitting a RACH preamble message—which may be referred to as a RACH Message 1 (Msg1) transmission—to base station 105-c. Base station 105-d may transmit the RACH preamble message using the initial beam pair link, or in order to establish the initial beam pair link. In some cases, base station 105-d may indicate one or more characteristics of base station 105-d (i.e., relay information 320) in the RACH preamble message. For example, base station 105-d may select the RACH preamble sequence or RACH preamble resources according to the relay information 320. In some cases, different RACH preambles or resources may correspond to different types of devices (e.g., whether the device is a relay device or not), different classes of relays (e.g., whether the device is a mobile relay, a low-cost relay, etc.), or different locations of devices. For example, if base station 105-d selects a RACH preamble for transmission from a set of 64 RACH preambles, RACH preambles 1 through 16 may indicate that the transmitting device is a relay device. Accordingly, base station 105-d may select a RACH preamble from preambles 1 through 16 for integration into the IAB system 300, while UE 115-b may select a RACH preamble from preambles 17 through 64 when performing a RACH procedure for initial access as an access device.

In some cases, base station 105-c may not receive the RACH preamble message transmitted by base station 105-d over the initial beam pair link (e.g., due to a quality level of the beam pair link, or due to interference), or base station 105-d may not receive a message in response. Base station 105-d may determine that the RACH preamble message was not successfully received if base station 105-d does not receive a random access response (RAR) message—which may be referred to as a RACH Message 2 (Msg2) transmission—from base station 105-c in response to the RACH preamble message within a pre-defined or dynamic RAR window. In these cases, base station 105-d may retransmit the RACH preamble message to base station 105-c. In some examples, base station 105-d may repeatedly retransmit the RACH preamble message until successfully receiving a RAR message in return. In other example, base station 105-d may retransmit the RACH preamble message a number of times up to a maximum RACH preamble transmission threshold. Similar to the RSRP threshold, relay devices may implement different (e.g., greater than) maximum RACH preamble transmission thresholds than access devices. The maximum RACH preamble transmission thresholds for these devices may be based on each other or may be independent. In a first example, base station 105-d may implement a maximum RACH preamble transmission threshold that is based on a conversion value Y and the maximum RACH preamble transmission threshold for a UE 115. The maximum RACH preamble transmission threshold for base station 105-d may be Y times the maximum RACH preamble transmission threshold for UE 115-b (e.g., where Y is greater than 1) or may be Y transmissions more than the maximum RACH preamble transmission threshold for UE 115-b, where Y is a fixed or dynamic value (e.g., 2, 3, etc.).

In a second example, the maximum RACH preamble transmission threshold for base station 105-d may be set to a default or pre-determined value. In a third example, different maximum RACH preamble transmission thresholds may be selected for different transmit beams, or different maximum RACH preamble transmission thresholds may correspond to different transmitted SSBs 310.

Once base station 105-d receives a RAR message in response from base station 105-c, base station 105-d may transmit a device identification message—which may be referred to as a RACH Msg3 transmission—to base station 105-c. This device identification message may additionally or alternatively indicate a characteristic of base station 105-d (e.g., the relay information 320). As discussed above, the indicated characteristic may indicate a location of base station 105-d (e.g., including elevation information, GPS location information, etc.), a pre-defined class or category of base station 105-d, whether base station 105-d is a relay device, or some combination of this information. In one specific example, the relay information 320 may include elevation information for base station 105-d. As illustrated, base station 105-c may serve UEs 115, such as UE 115-b, at a different elevation than base station 105-d. Accordingly, base station 105-c may sweep through a set of beams 305 corresponding to a first elevation when transmitting SSBs 310 for UE access. Base station 105-d may search for and detect these SSBs 310 (e.g., based on using suitable receive beams for reception beam-sweeping or based on energy accumulation over multiple synchronization periods), and may establish a "weak" beam pair link with base station 105-c using the detected SSBs 310. In some cases, the beam pair link may be "weak" due to the beams 315 of the beam pair link not being directed towards the correct elevation for a backhaul link. Base station 105-d may transmit the relay information 320 to base station 105-c to improve the link, where the relay information 320 includes elevation information for base station 105-d. Base station 105-c and base station 105-d may utilize the elevation information to select new beams 325 for an updated beam pair link for backhaul communications, where the updated beam directions are based on the elevation information.

In some cases, base station 105-d may transmit relay information 320 in special signaling. For example, base station 105-d may complete the RACH procedure to establish an initial link with base station 105-c, and may transmit the relay information 320 in a layer 1 (L1) reference signal, a MAC channel element (MAC-CE), a RRC message, an upper-layer message, or any combination of these messages following the RACH procedure. Base station 105-c and base station 105-d may then establish an updated beam pair link based on this relay information 320. In some cases, the base stations 105 may perform additional beam-sweeping procedures, an additional RACH procedure, or both to update the beam pair link.

Additionally or alternatively to utilizing different thresholds, as described above, relay devices may implement different transmit power control (TPC) parameters than access devices. For example, base station 105-d may use a different target received power value or power ramping steps than UE 115-b for transmission of RACH preamble messages, device identification messages, special signaling, or any combination of these messages or signals. In one example, base station 105-d may utilize a greater target received power for transmissions to base station 105-c than UE 115-b (e.g., due to a "weak" beam pair link). In a second example, base station 105-d may utilize larger power ramping steps between retransmissions to base station 105-c than UE 115-b. These TPC parameters may improve the reliability or throughput of transmissions from base station 105-d to base station 105-c when using a beam pair link with a relatively low quality metric.

These different configurations for the relay devices may either be indicated using information signals or may be pre-configured. For example, base station 105-d may use these thresholds or TPC parameters according to a backhaul-specific configuration. In some cases, base station 105-d may be configured with this information prior to power up. In other cases, base station 105-d may receive these configurations in a master information block (MIB), a system information block (SIB), remaining minimum system information (RMSI), other system information (OSI), a non-standalone (NSA) message, or any combination of these or similar information messages. Base station 105-d may receive the information message(s) from a neighboring base station 105 or cell (e.g., such as base station 105-c). Utilizing these different thresholds or TPC parameters may allow base station 105-d to establish a beam pair link based on an SSB 310 received at a lower RSRP than a UE 115-b could. Such a beam pair link may accordingly be referred to as a "weak" beam pair link, due to the relatively low RSRP.

If base station 105-c receives relay information 320 for base station 105-d (e.g., in a RACH preamble message, a device identification message, special signaling, etc.), base station 105-c may initiate a beam management procedure based on the received relay information 320. In some case, base stations 105-c and 105-d may establish a first beam pair link based on the RACH procedure, and may perform this beam management procedure to refine the beam pair link in order to improve a quality metric or quality level of the first beam pair link. In other cases, base stations 105-c and 105-d may perform the beam management procedure during the RACH procedure, such that the beam pair link established based on the RACH procedure already includes any beam refinement according to the relay information 320. In some cases, the beam management procedure may include base station 105-c, base station 105-d, or both searching through a set of beam directions to determine a direction for a second beam pair link. These beam directions may be different than the beam directions used for the transmission and reception beam-sweeping procedures (e.g., directed towards different elevations, or with smaller differences between beam directions due to narrower beams). Based on the beam management procedure, base stations 105-c and 105-d may switch from the first beam pair link containing beams 315 to a second beam pair link containing beams 325. Based on the beam widths, directions, resources, or some combination of these parameters, this second beam pair link may correspond to a greater quality level than the first beam pair link. Base stations 105-c and 105-d may perform backhaul communications using this second beam pair link for the IAB system 300.

Base station 105-d may perform a similar integration procedure with any neighboring base stations 105 detected in such a manner. In this way, base station 105-d may act as a relay device for multiple donor or relay base stations in the IAB system 300. Additionally, the neighboring base stations 105 may act as relay devices for base station 105-d based on the established backhaul links (e.g., in a multi-hop backhaul system). In some cases, base station 105-d may remain powered up, and accordingly may only perform this initial integration procedure one time (i.e., when initially powering up). In other cases, base station 105-d may periodically or aperiodically power down (e.g., for saving power, maintenance reasons, or due to system failures at base station

105-*d*). In these cases, base station 105-*d* may either store indications of the established beam pair links (e.g., the updated or "strong" beam pair links) in memory and may re-establish these beam pair links upon powering up again, or may perform the initial integration procedure again upon powering up.

In some cases, base station 105-*c* may perform backhaul-specific reference signal transmissions. For example, base station 105-*c* may transmit backhaul-specific reference signals beam-swept in a mmW system. These backhaul-specific reference signals may be transmitted periodically (e.g., less often than access-specific reference signals) or based on a trigger (e.g., due to receiving an indication that a nearby relay device has recently powered up). Base station 105-*c* may utilize different beams for this transmission beam-sweeping procedure than used for access-specific reference signals (e.g., due to different expected locations or elevations of relay devices and access devices). These different beams for backhaul-specific reference signals may cover a larger angular region than the beams for access-specific reference signals. Similarly, base station 105-*d* may perform reception beam-sweeping to receive reference signals intended for backhaul connections, intended for access connections, or both, where these different beam-sweeping procedures may include different beams and coverage angles. Base station 105-*d* may still be able to detect reference signals transmitted on beams intended for device access (e.g., UEs 115) based on suitable reception beam-sweeping, energy accumulation over multiple synchronization periods, or both.

Figure 4:
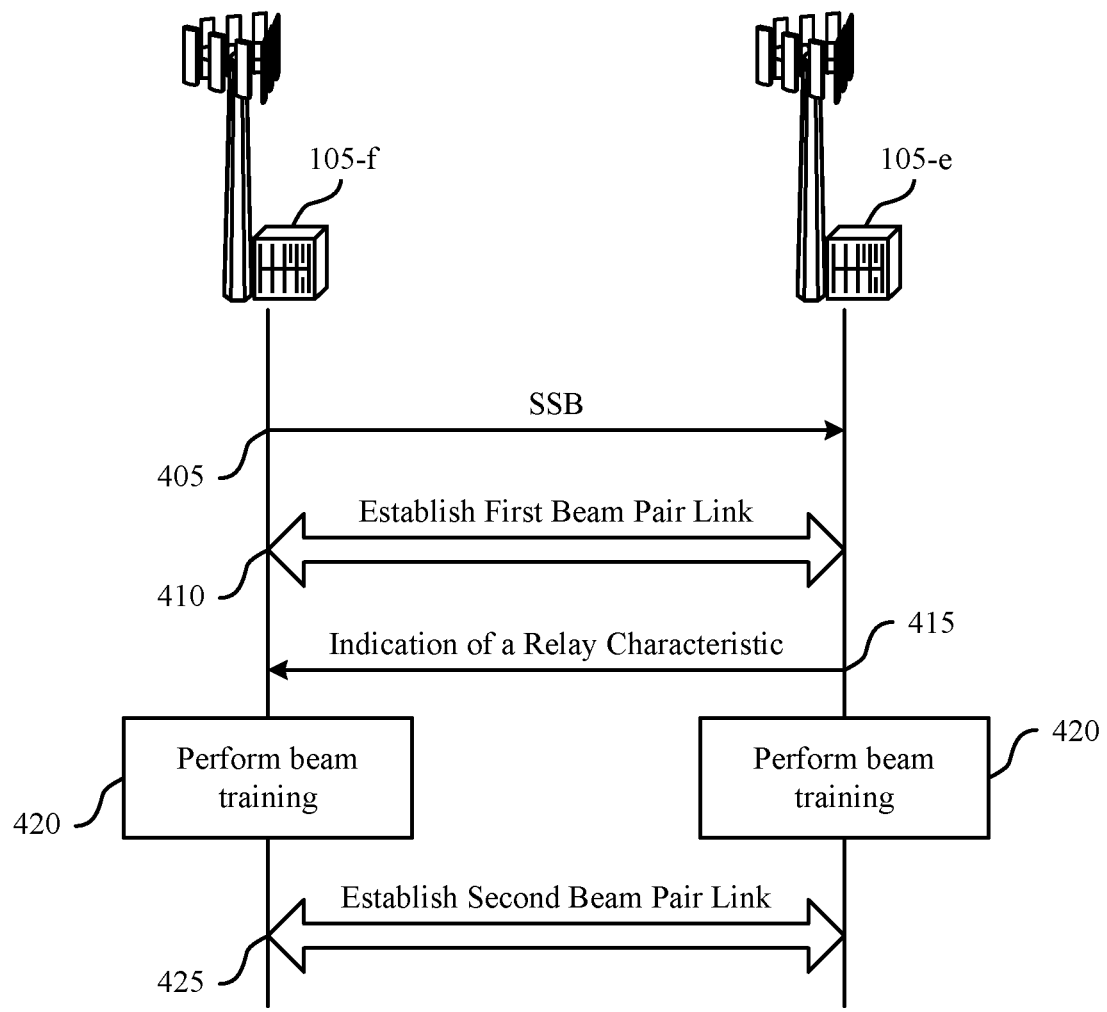
FIG. 4 illustrates an example of a process flow that supports initial integration of wireless devices in an IAB system in accordance with aspects of the present disclosure.

FIG. 4 illustrates an example of a process flow 400 that supports initial integration of wireless devices in an IAB system in accordance with aspects of the present disclosure. Process flow 400 may include a first wireless device and a second wireless device. As illustrated, the first wireless device may be an example of a base station 105 (e.g., a relay base station, such as base station 105-*e*) and the second wireless device may be an example of a base station 105 (e.g., a donor or different relay base station, such as base station 105-*f*). In other examples, these wireless devices may be other types of relay and network devices, including but not limited to UEs 115. In some implementations, the processes described below may be performed in a different order, or may include one or more additional or alternative processes performed by the wireless devices.

At 405, the second wireless device may transmit an SSB (e.g., in a transmission beam-sweeping procedure). The first wireless device may detect the SSB (e.g., in a reception beam-sweeping procedure) and receive the SSB according to an RSRP threshold. This RSRP threshold may be lower than a second RSRP threshold associated with an access device (e.g., a UE 115).

At 410, the first wireless device and the second wireless device may establish a first beam pair link based on the SSB. This first beam pair link may be associated with a first quality level or RSRP metric.

At 415, the first wireless device may transmit an indication of a characteristic of the first wireless device to the second wireless device in a beamformed transmission (e.g., using the first beam pair link). The characteristic may be an example of a physical location of the first wireless device, an elevation of the first wireless device, a GPS location of the first wireless device, a class or category of the first wireless device corresponding to integration capabilities of the first wireless device, or some combination of these. In some cases, this characteristic may be indicated by a RACH preamble message, a device identification message (e.g., a RACH Msg3), or some special signaling. The first wireless device may transmit these messages or signals using different configurations than an access device. For example, the first wireless device may utilize a different maximum RACH preamble transmission threshold, power ramping step size, target received power threshold, or any combination of these parameters than a UE 115.

At 420, the first wireless device, the second wireless device, or both may perform beam training based on the characteristic of the first wireless device. In one example, the second wireless device may select a new beam for the beam pair link based on the characteristic, and the first wireless device may select a new beam for the beam pair link based on this newly selected beam for the second wireless device.

At 425, the first wireless device and the second wireless device may establish a second beam pair link based on the beam training. This second beam pair link may be associated with a second quality level or RSRP metric that is greater than the first quality level or RSRP metric for the first beam pair link. In some cases, the second beam pair link may include narrower beams than the first beam pair link. The first wireless device and the second wireless device may use this second beam pair link for future communications. For example, if the first wireless device is a relay base station 105-*e* and the second wireless device is a donor or relay base station 105-*f*, the devices may utilize this second beam pair link for beamformed backhaul communications in an IAB system.

Figure 5:
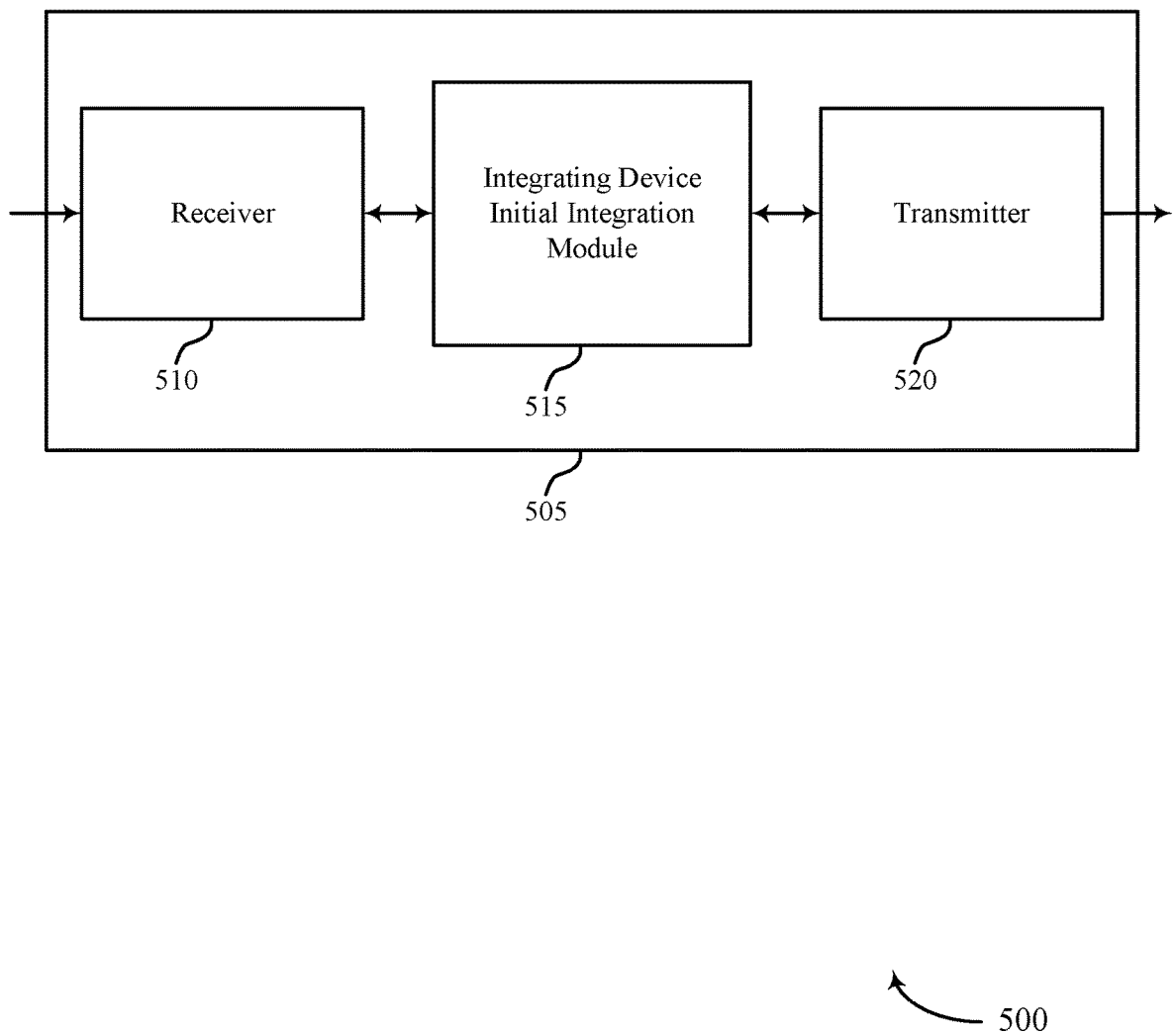
FIGS. 5 and 6 show block diagrams of wireless devices that support initial integration of wireless devices in an IAB system in accordance with aspects of the present disclosure.

FIG. 5 shows a block diagram 500 of a wireless device 505 that supports initial integration of wireless devices in an IAB system in accordance with aspects of the present disclosure. Wireless device 505 may be an example of aspects of an integrating device, such as a relay base station 105 or a UE 115 as described herein, and may be referred to as a "first wireless device." Wireless device 505 may include receiver 510, integrating device initial integration module 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to initial integration of wireless devices in an IAB system, etc.). Information may be passed on to other components of the device. The receiver 510 may be an example of aspects of the transceiver 835 described with reference to FIG. 8. The receiver 510 may utilize a single antenna or a set of antennas.

Integrating device initial integration module 515 may be an example of aspects of the integrating device initial integration module 815 described with reference to FIG. 8.

Integrating device initial integration module 515 and/or at least some of its various sub-components may be implemented in hardware, software executed by a processor, firmware, or any combination thereof. If implemented in software executed by a processor, the functions of the integrating device initial integration module 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The integrating device initial integration module 515 and/or at least some of its various sub-components may be physically located at various positions, including being distributed such that portions of functions are implemented at different physical locations by one or more physical devices. In some examples, integrating device initial integration module 515 and/or at least some of its various sub-components may be a separate and distinct component in accordance with various aspects of the present disclosure. In other examples, integrating device initial integration module 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Integrating device initial integration module 515 may transmit, to a second wireless device in a beamformed transmission using a first beam pair link associated with a first quality level, an indication of a characteristic of the first wireless device (e.g., wireless device 505), perform beam training based on the characteristic of the first wireless device, and establish, with the second wireless device, a second beam pair link associated with a second quality level greater than the first quality level based on the beam training.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
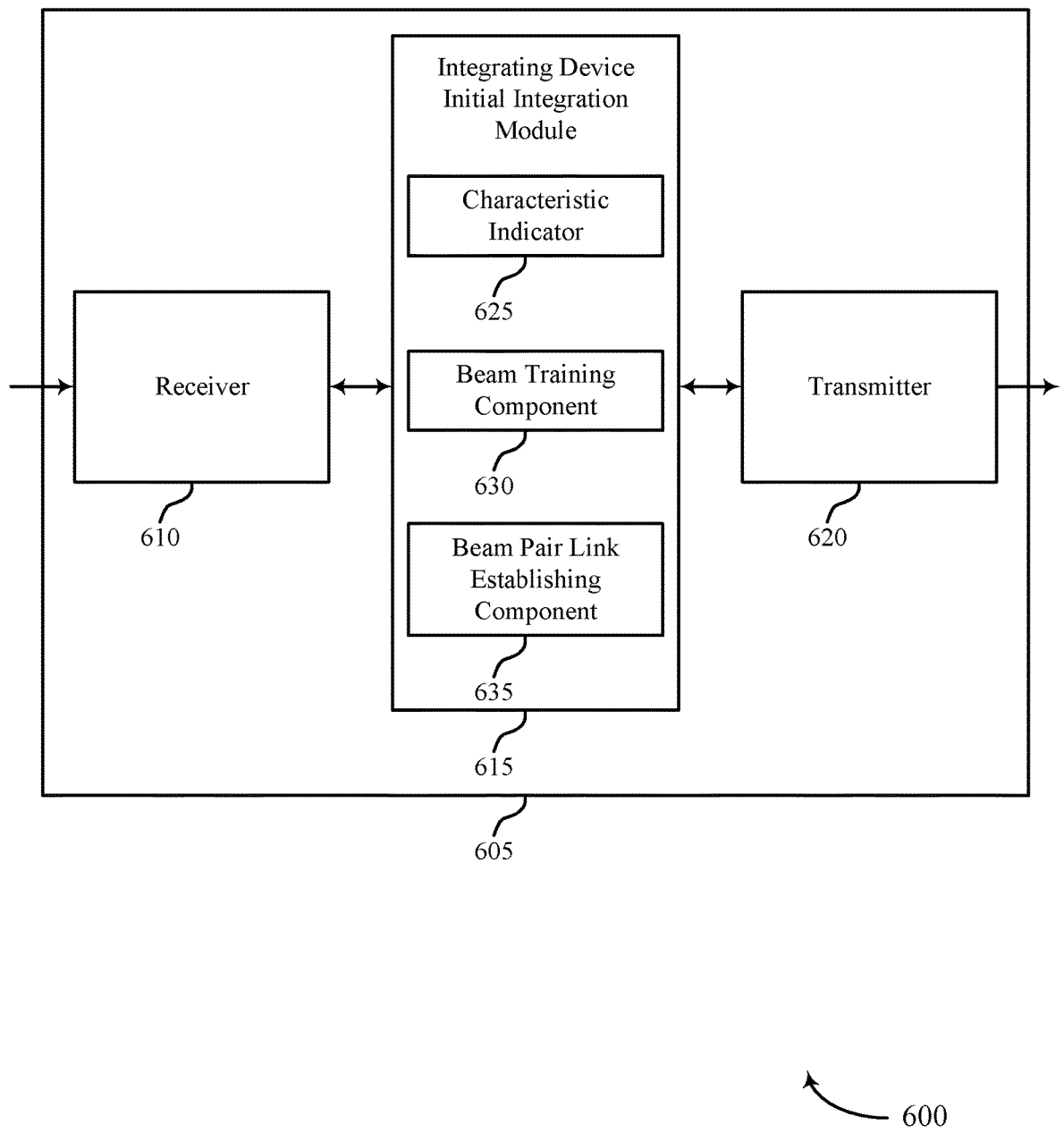

FIG. 6 shows a block diagram 600 of a wireless device 605 that supports initial integration of wireless devices in an IAB system in accordance with aspects of the present disclosure. Wireless device 605 may be an example of aspects of a wireless device 505 or an integrating device, such as a relay base station 105 or a UE 115, as described with reference to FIGS. 1 through 5. Wireless device 605 may be referred to as a "first wireless device." Wireless device 605 may include receiver 610, integrating device initial integration module 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to initial integration of wireless devices in an IAB system, etc.). Information may be passed on to other components of the device. The receiver 610 may be an example of aspects of the transceiver 835 described with reference to FIG. 8. The receiver 610 may utilize a single antenna or a set of antennas.

Integrating device initial integration module 615 may be an example of aspects of the integrating device initial integration module 815 described with reference to FIG. 8. Integrating device initial integration module 615 may also include characteristic indicator 625, beam training component 630, and beam pair link establishing component 635.

Characteristic indicator 625 may transmit, to a second wireless device in a beamformed transmission using a first beam pair link associated with a first quality level, an indication of a characteristic of the first wireless device. In some cases, the characteristic of the first wireless device includes a physical location of the first wireless device, an elevation of the first wireless device, a GPS location of the first wireless device, or a combination thereof. In some cases, the characteristic of the first wireless device includes a class or category of the first wireless device corresponding to integration capabilities of the first wireless device. In some cases, transmitting the indication of the characteristic of the first wireless device includes transmitting an L1 reference signal, a MAC-CE, an RRC message, an upper-layer message, or a combination thereof including the indication of the characteristic of the first wireless device.

Beam training component 630 may perform beam training based on the characteristic of the first wireless device. Beam pair link establishing component 635 may establish, with the second wireless device, a second beam pair link associated with a second quality level greater than the first quality level based on the beam training. In some cases, the first quality level corresponds to a first RSRP metric, and the second quality level corresponds to a second RSRP metric greater than the first RSRP metric. In some cases, the second beam pair link includes narrower beams than the first beam pair link.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
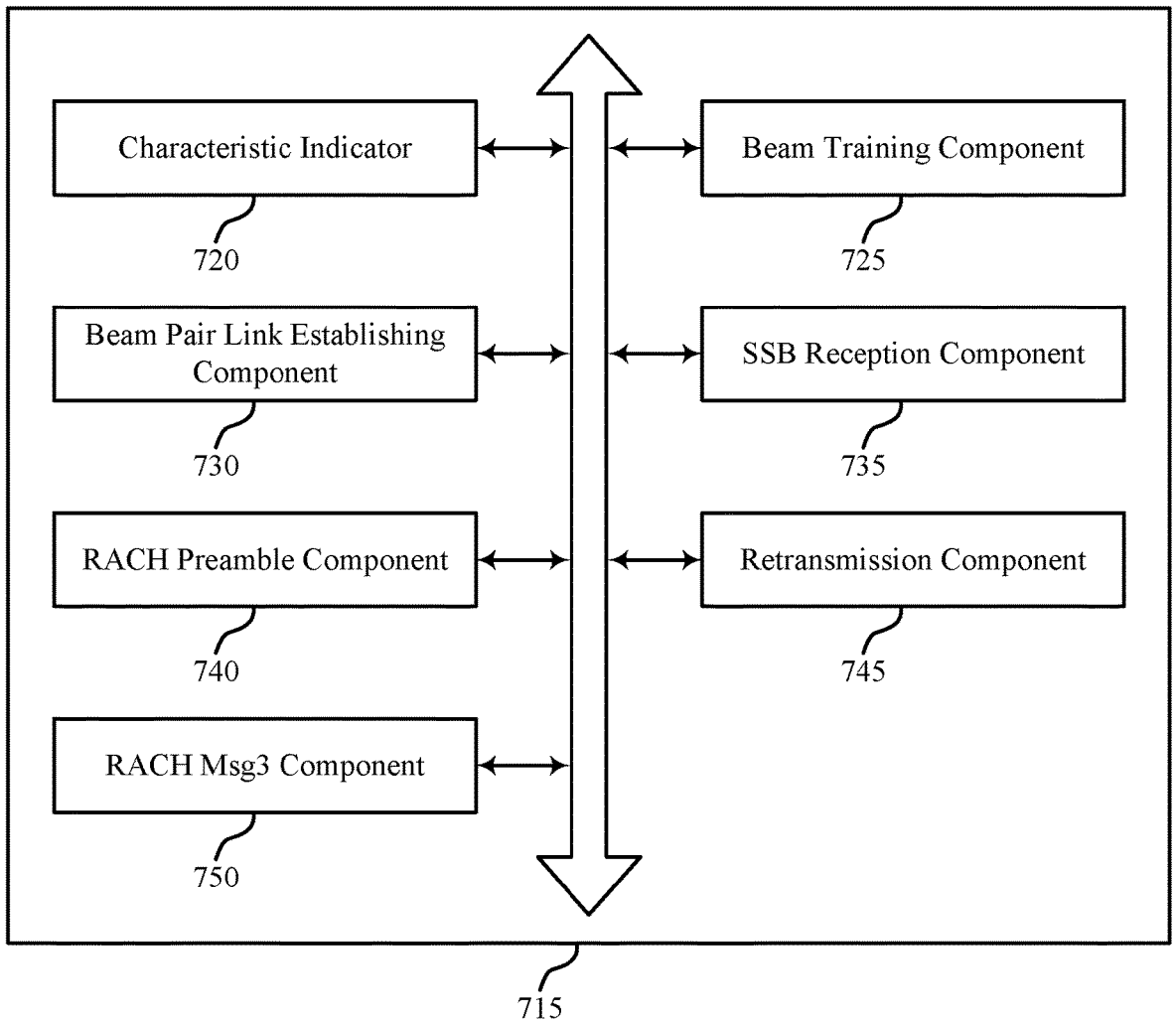
FIG. 7 shows a block diagram of an integrating device initial integration module that supports initial integration of wireless devices in an IAB system in accordance with aspects of the present disclosure.

FIG. 7 shows a block diagram 700 of an integrating device initial integration module 715 that supports initial integration of wireless devices in an IAB system in accordance with aspects of the present disclosure. The integrating device initial integration module 715 may be an example of aspects of an integrating device initial integration module 515, 615, or 815 described with reference to FIGS. 5, 6, and 8. The integrating device initial integration module 715 may include characteristic indicator 720, beam training component 725, beam pair link establishing component 730, SSB reception component 735, RACH preamble component 740, retransmission component 745, and RACH Msg3 Component 750. Each of these modules may communicate, directly or indirectly, with one another (e.g., via one or more buses).

Characteristic indicator 720 may transmit, from a first wireless device to a second wireless device in a beamformed transmission using a first beam pair link associated with a first quality level, an indication of a characteristic of the first wireless device. In some cases, the characteristic of the first wireless device includes a physical location of the first wireless device, an elevation of the first wireless device, a GPS location of the first wireless device, or a combination thereof. In some cases, the characteristic of the first wireless device includes a class or category of the first wireless device corresponding to integration capabilities of the first wireless device. In some cases, transmitting the indication of the characteristic of the first wireless device includes transmitting an L1 reference signal, a MAC-CE, an RRC message, an upper-layer message, or a combination thereof including the indication of the characteristic of the first wireless device.

Beam training component 725 may perform beam training based on the characteristic of the first wireless device. Beam pair link establishing component 730 may establish, with the second wireless device, a second beam pair link associated with a second quality level greater than the first quality level based on the beam training. In some cases, the first quality level corresponds to a first RSRP metric. In some cases, the second quality level corresponds to a second RSRP metric greater than the first RSRP metric. In some cases, the second beam pair link includes narrower beams than the first beam pair link. In some cases, the first wireless device is a relay base station, and the second wireless device is a donor base station or a different relay base station.

SSB reception component 735 may receive an SSB from the second wireless device. In some cases, beam pair link establishing component 730 may establish the first beam pair link based on the SSB. In some cases, receiving the SSB includes receiving the SSB in at least one beam during a reception beam-sweeping procedure. In some cases, the SSB is received according to a first RSRP threshold that is less than a second RSRP threshold associated with a UE 115. In some cases, the first RSRP threshold is configured based on the second RSRP threshold and a conversion value or is configured to a default value independent of the second RSRP threshold. In some cases, the default value is equal to zero. In some cases, SSB reception component 735 may configure the first RSRP threshold according to a received MIB, SIB, RMSI, OSI, NSA message, or a combination thereof.

RACH preamble component 740 may transmit a RACH preamble message over the first beam pair link. In some cases, the RACH preamble message includes the indication of the characteristic of the first wireless device. For example, RACH preamble component 740 may select a RACH preamble sequence or resources for the RACH preamble message based on the characteristic of the first wireless device. In some cases, the RACH preamble message is transmitted according to a first target received power threshold that is greater than a second target received power threshold associated with a UE 115.

Retransmission component 745 may transmit one or more RACH preamble message retransmissions according to a first maximum RACH preamble transmission threshold that is greater than a second maximum RACH preamble transmission threshold associated with a UE 115. In some cases, the first maximum RACH preamble transmission threshold is configured based on the second maximum RACH preamble transmission threshold and a conversion value or is configured to a default value independent of the second maximum RACH preamble transmission threshold. In some cases, retransmission component 745 may configure the first maximum RACH preamble transmission threshold according to a received MIB, SIB, RMSI, OSI, NSA message, or a combination thereof. In some cases, retransmission component 745 may perform power ramping for the one or more RACH preamble message retransmissions, where a first power ramping step for the power ramping is greater than a second power ramping step associated with the UE.

In some cases, transmitting the indication of the characteristic of the first wireless device includes RACH Msg3 component 750 transmitting a device identification message including the indication of the characteristic of the first wireless device. In some cases, the device identification message is an example of a RACH Msg3 transmission.

Figure 8:
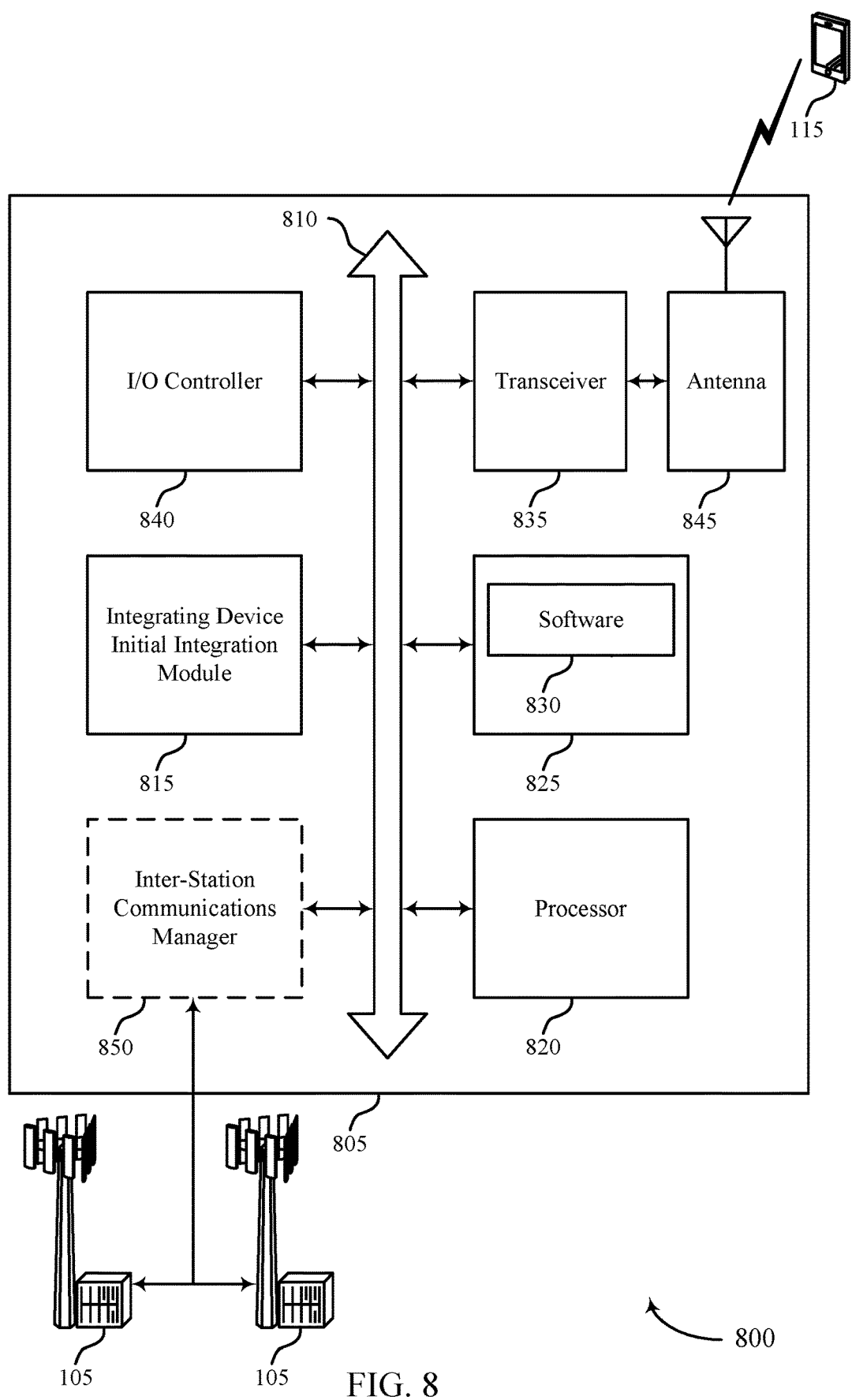
FIG. 8 illustrates a block diagram of a system including a device that supports initial integration of wireless devices in an IAB system in accordance with aspects of the present disclosure.

FIG. 8 shows a diagram of a system 800 including a device 805 that supports initial integration of wireless devices in an IAB system in accordance with aspects of the present disclosure. Device 805 may be an example of or include the components of wireless device 505, wireless device 605, or an integrating device, such as a relay base station 105 or a UE 115, as described above, for example, with reference to FIGS. 1 through 6. Device 805 may include components for bi-directional voice and data communications including components for transmitting and receiving communications, including integrating device initial integration module 815, processor 820, memory 825, software 830, transceiver 835, I/O controller 840, and antenna 845. In some cases (e.g., if device 805 is a relay base station 105), device 805 may include an inter-station communications manager 850 for communicating with other base stations 105 over wireless backhaul links. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting initial integration of wireless devices in an IAB system).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support initial integration of wireless devices in an IAB system. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas 845, wired, or wireless links as described above. For example, the transceiver 835 may represent a wireless transceiver and may communicate bi-directionally with another wireless transceiver (e.g., at a UE 115 or a base station 105). The transceiver 835 may also include a modem to modulate the packets and provide the modulated packets to the antennas 845 for transmission, and to demodulate packets received from the antennas 845.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an LTE/LTE-A wireless communication network technology to provide communication between base stations 105.

Figure 9:
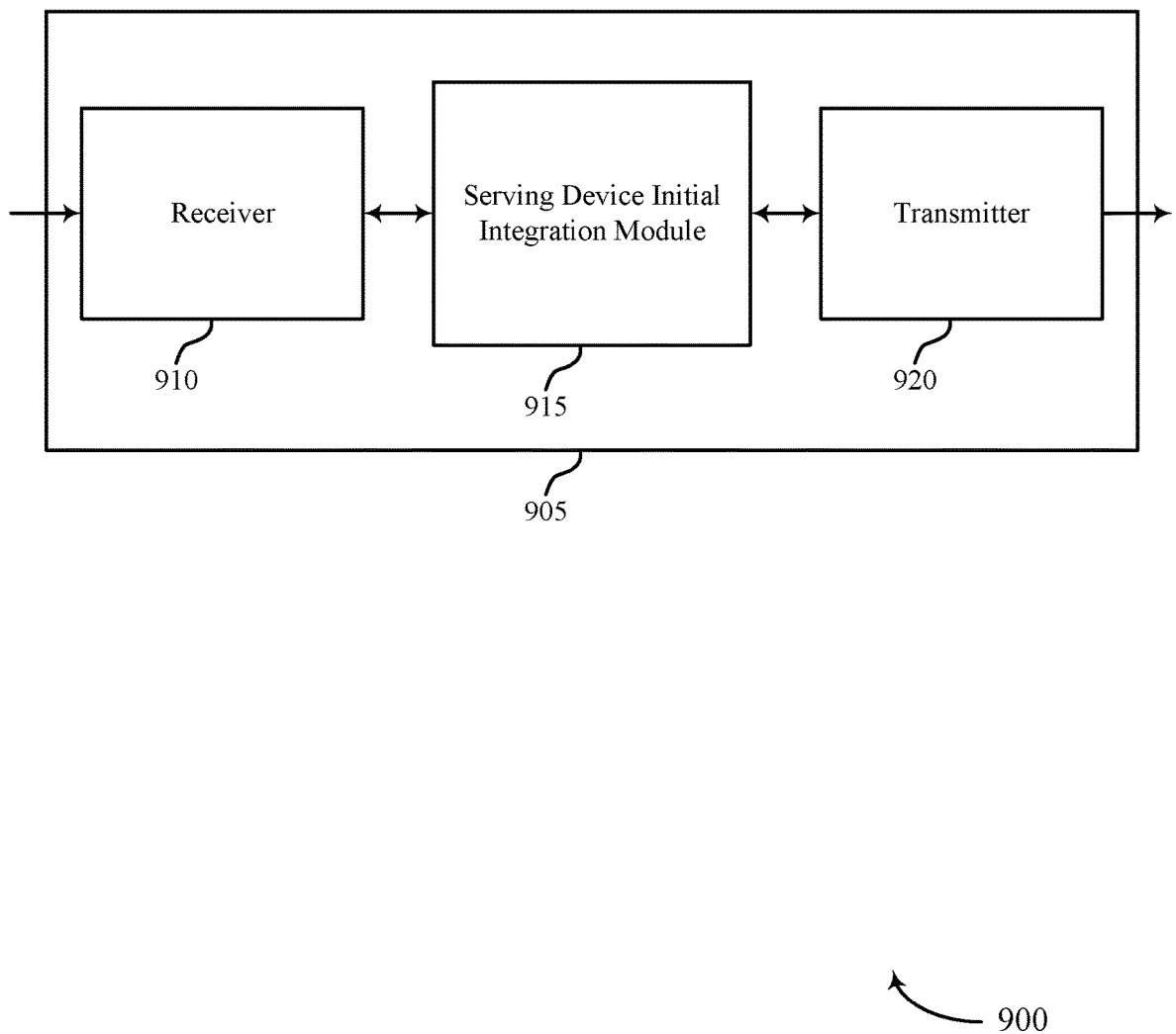
FIGS. 9 and 10 show block diagrams of wireless devices that support initial integration of wireless devices in an IAB system in accordance with aspects of the present disclosure.

FIG. 9 shows a block diagram 900 of a wireless device 905 that supports initial integration of wireless devices in an IAB system in accordance with aspects of the present disclosure. Wireless device 905 may be an example of aspects of a serving device, such as a donor base station 105, a relay base station 105, or a UE 115, as described herein. Wireless device 905 may be referred to as a "second wireless device." Wireless device 905 may include receiver 910, serving device initial integration module 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to initial integration of wireless devices in an IAB system, etc.). Information may be passed on to other components of the device. The receiver 910 may be an example of aspects of the transceiver 1235 described with reference to FIG. 12. The receiver 910 may utilize a single antenna or a set of antennas.

Serving device initial integration module 915 may be an example of aspects of the serving device initial integration module 1215 described with reference to FIG. 12.

Serving device initial integration module 915 and/or at least some of its various sub-components may be implemented in hardware, software executed by a processor, firmware, or any combination thereof. If implemented in software executed by a processor, the functions of the serving device initial integration module 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The serving device initial integration module 915 and/or at least some of its various sub-components may be physically located at various positions, including being distributed such that portions of functions are implemented at different physical locations by one or more physical devices. In some examples, serving device initial integration module 915 and/or at least some of its various sub-components may be a separate and distinct component in accordance with various aspects of the present disclosure. In other examples, serving device initial integration module 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Serving device initial integration module 915 may receive, from a first wireless device in a beamformed transmission over a first beam pair link associated with a first quality level, an indication of a characteristic of the first wireless device, perform beam training based on the characteristic of the first wireless device, and establish, with the first wireless device, a second beam pair link associated with a second quality level greater than the first quality level based on the beam training.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
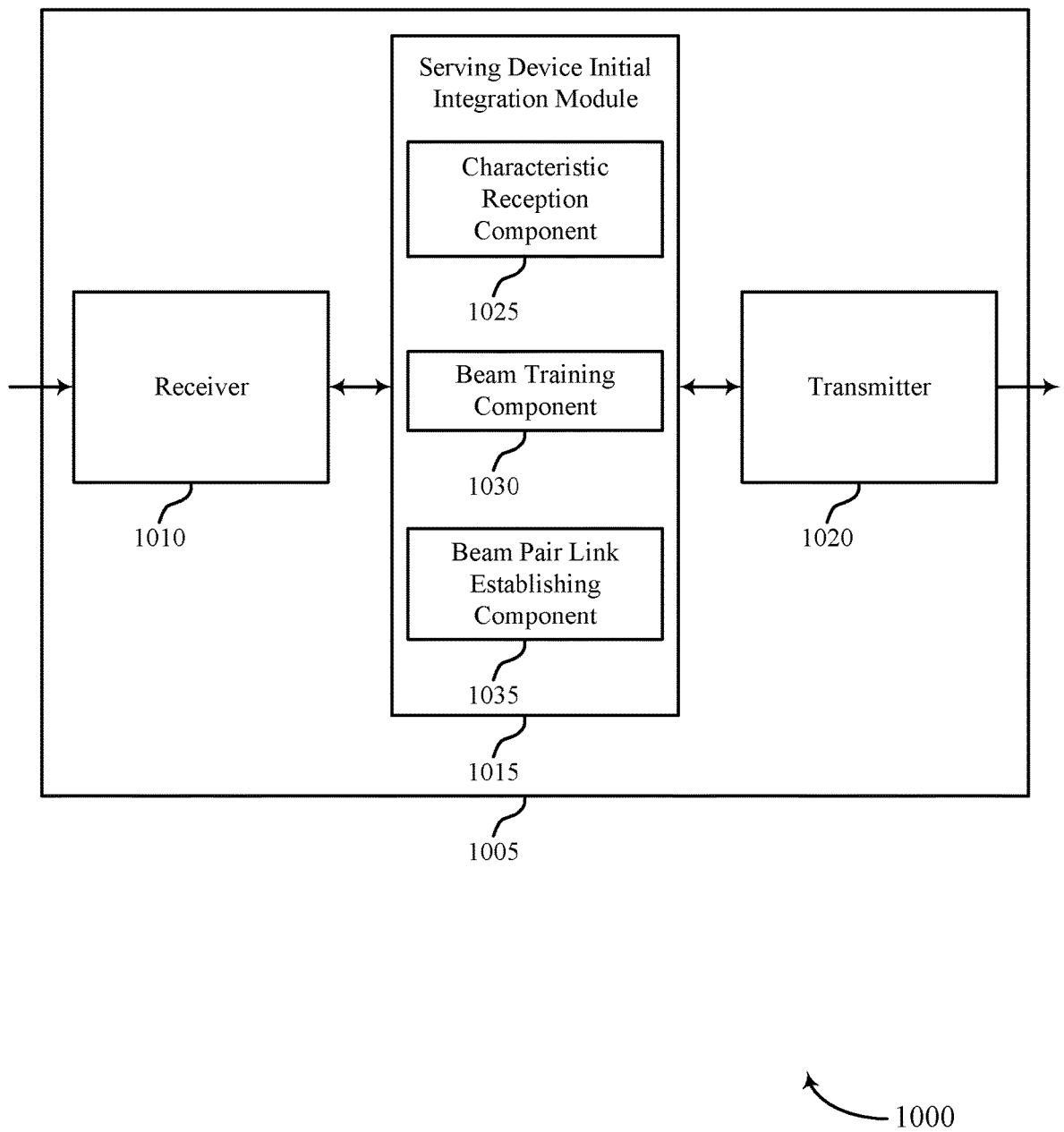

FIG. 10 shows a block diagram 1000 of a wireless device 1005 that supports initial integration of wireless devices in an IAB system in accordance with aspects of the present disclosure. Wireless device 1005 may be an example of aspects of a wireless device 905 or a serving device, such as a donor base station 105, a relay base station 105, or a UE 115, as described with reference to FIGS. 1 through 4 and 9. Wireless device 1005 may be referred to as a "second wireless device." Wireless device 1005 may include receiver 1010, serving device initial integration module 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to initial integration of wireless devices in an IAB system, etc.). Information may be passed on to other components of the device. The receiver 1010 may be an example of aspects of the transceiver 1235 described with reference to FIG. 12. The receiver 1010 may utilize a single antenna or a set of antennas.

Serving device initial integration module 1015 may be an example of aspects of the serving device initial integration module 1215 described with reference to FIG. 12. Serving device initial integration module 1015 may also include characteristic reception component 1025, beam training component 1030, and beam pair link establishing component 1035.

Characteristic reception component 1025 may receive, from a first wireless device in a beamformed transmission over a first beam pair link associated with a first quality level, an indication of a characteristic of the first wireless device. In some cases, characteristic reception component 1025 may receive an L1 reference signal, a MAC-CE, an RRC message, an upper-layer message, or a combination thereof including the indication of the characteristic of the first wireless device. In some cases, the characteristic of the first wireless device includes a physical location of the first wireless device, an elevation of the first wireless device, a GPS location of the first wireless device, or a combination thereof. In some cases, the characteristic of the first wireless device includes a class or category of the first wireless device corresponding to integration capabilities of the first wireless device.

Beam training component 1030 may perform beam training based on the characteristic of the first wireless device. Beam pair link establishing component 1035 may establish, with the first wireless device, a second beam pair link associated with a second quality level greater than the first quality level based on the beam training. In some cases, the first quality level corresponds to a first RSRP metric and the second quality level corresponds to a second RSRP metric greater than the first RSRP metric. In some cases, the second beam pair link includes narrower beams than the first beam pair link.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
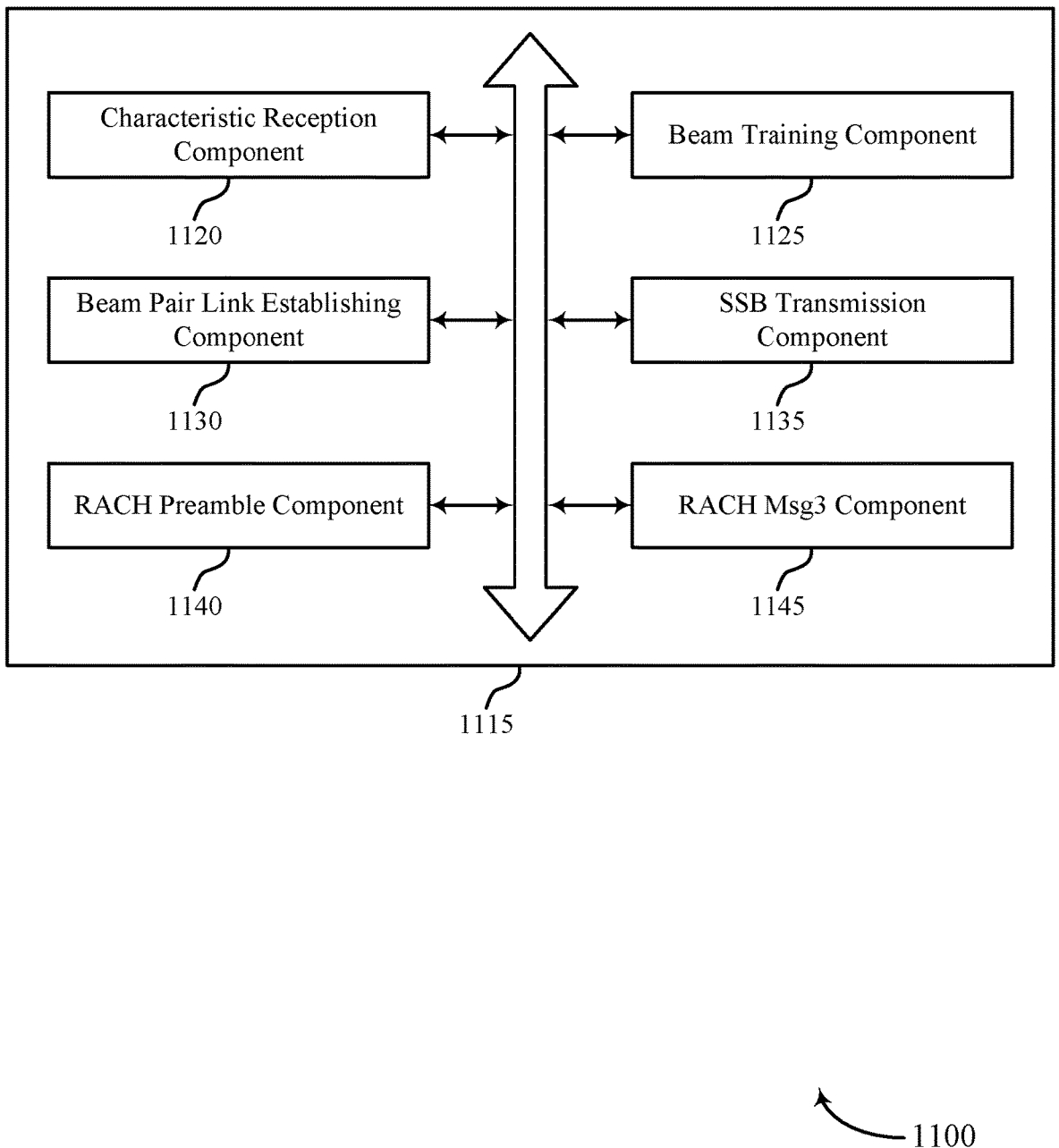
FIG. 11 shows a block diagram of a serving device initial integration module that supports initial integration of wireless devices in an IAB system in accordance with aspects of the present disclosure.

FIG. 11 shows a block diagram 1100 of a serving device initial integration module 1115 that supports initial integration of wireless devices in an IAB system in accordance with aspects of the present disclosure. The serving device initial integration module 1115 may be an example of aspects of a serving device initial integration module 915, 1015, or 1215 described with reference to FIGS. 9, 10, and 12. The serving device initial integration module 1115 may include characteristic reception component 1120, beam training component 1125, beam pair link establishing component 1130, SSB transmission component 1135, RACH preamble component 1140, and RACH Msg3 Component 1145. Each of these modules may communicate, directly or indirectly, with one another (e.g., via one or more buses).

Characteristic reception component 1120 may receive, at a second wireless device and from a first wireless device in a beamformed transmission over a first beam pair link associated with a first quality level, an indication of a characteristic of the first wireless device. In some cases, characteristic reception component 1120 may receive an L1 reference signal, a MAC-CE, an RRC message, an upper-layer message, or a combination thereof including the indication of the characteristic of the first wireless device. In some cases, the characteristic of the first wireless device includes a physical location of the first wireless device, an elevation of the first wireless device, a GPS location of the first wireless device, or a combination thereof. In some cases, the characteristic of the first wireless device includes a class or category of the first wireless device corresponding to integration capabilities of the first wireless device.

Beam training component 1125 may perform beam training based on the characteristic of the first wireless device. Beam pair link establishing component 1130 may establish, with the first wireless device, a second beam pair link associated with a second quality level greater than the first quality level based on the beam training. In some cases, the first quality level corresponds to a first RSRP metric and the second quality level corresponds to a second RSRP metric greater than the first RSRP metric. In some cases, the second beam pair link includes narrower beams than the first beam pair link. In some cases, the second wireless device is a donor base station or a relay base station, and the first wireless device is a different relay base station.

SSB transmission component 1135 may transmit an SSB. In some cases, beam pair link establishing component 1130 may establish the first beam pair link based on the SSB. In some cases, transmitting the SSB includes transmitting a set of SSBs, where each SSB of the set of SSBs is transmitted on a different beam in a transmission beam-sweeping procedure. In some cases, the transmission beam-sweeping procedure for the first wireless device includes a first set of beams different than a second set of beams associated with a transmission beam-sweeping procedure for UE access.

RACH preamble component 1140 may receive a RACH preamble message over the first beam pair link, where the RACH preamble message includes the indication of the characteristic of the first wireless device.

RACH Msg3 Component 1145 may receive a device identification message over the first beam pair link, where the device identification message includes the indication of the characteristic of the first wireless device. In some cases, the device identification message is an example of a RACH Msg3 transmission.

Figure 12:
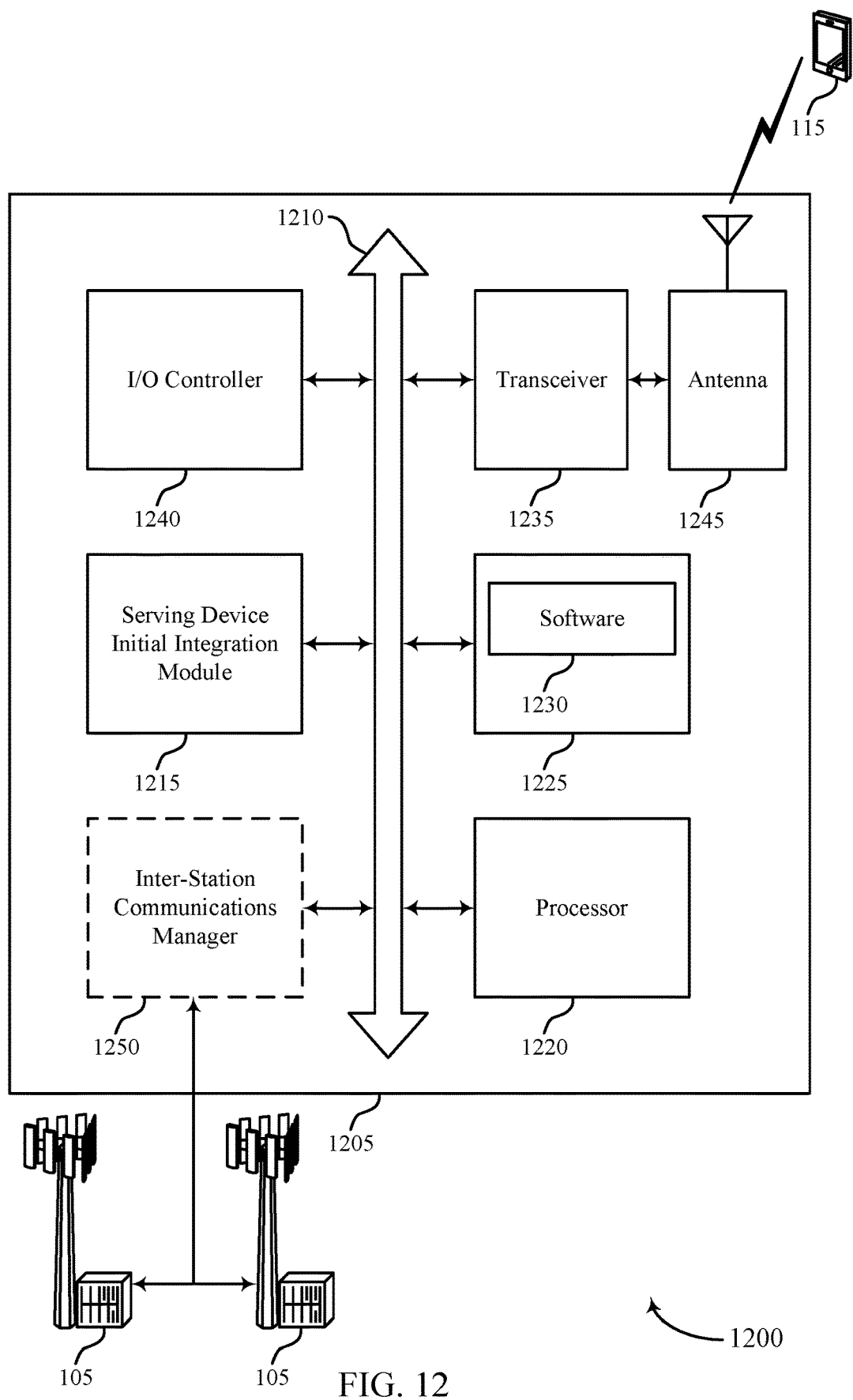
FIG. 12 illustrates a block diagram of a system including a device that supports initial integration of wireless devices in an IAB system in accordance with aspects of the present disclosure.

FIG. 12 shows a diagram of a system 1200 including a device 1205 that supports initial integration of wireless devices in an IAB system in accordance with aspects of the present disclosure. Device 1205 may be an example of or include the components of a serving device, such as a donor base station 105, a relay base station 105, or a UE 115 as described above, for example, with reference to FIGS. 1 through 4, 9, and 10. Device 1205 may include components for bi-directional voice and data communications including components for transmitting and receiving communications, including serving device initial integration module 1215, processor 1220, memory 1225, software 1230, transceiver 1235, I/O controller 1240, and antenna 1245. In some cases (e.g., if device 1205 is a donor base station or a relay base station), device 1205 may include an inter-station communications manager for communicating with other base stations 105 over wireless backhaul links. These components may be in electronic communication via one or more buses (e.g., bus 1210).

Processor 1220 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting initial integration of wireless devices in an IAB system).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support initial integration of wireless devices in an IAB system. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas 1245, wired, or wireless links as described above. For example, the transceiver 1235 may represent a wireless transceiver and may communicate bi-directionally with another wireless transceiver (e.g., at a UE 115 or a base station 105). The transceiver 1235 may also include a modem to modulate the packets and provide the modulated packets to the antennas 1245 for transmission, and to demodulate packets received from the antennas 1245.

I/O controller 1240 may manage input and output signals for device 1205. I/O controller 1240 may also manage peripherals not integrated into device 1205. In some cases, I/O controller 1240 may represent a physical connection or port to an external peripheral. In some cases, I/O controller 1240 may utilize an operating system such as iOS®, ANDROID®, MS-DOS®, MS-WINDOWS®, OS/2®, UNIX®, LINUX®, or another known operating system. In other cases, I/O controller 1240 may represent or interact with a modem, a keyboard, a mouse, a touchscreen, or a similar device. In some cases, I/O controller 1240 may be implemented as part of a processor. In some cases, a user may interact with device 1205 via I/O controller 1240 or via hardware components controlled by I/O controller 1240.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
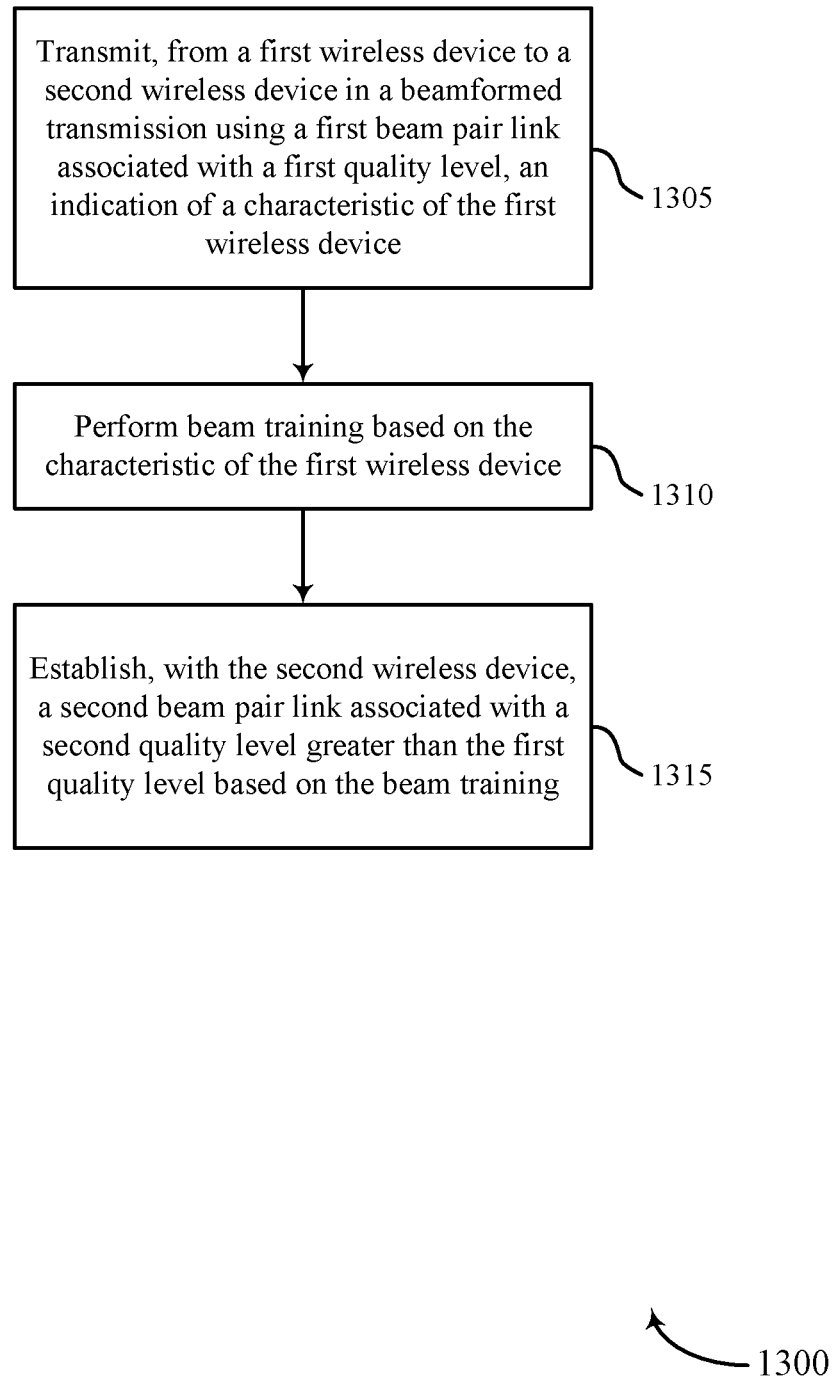
FIGS. 13 through 16 show flowcharts illustrating methods for initial integration of wireless devices in an IAB system in accordance with aspects of the present disclosure.

FIG. 13 shows a flowchart illustrating a method 1300 for initial integration of wireless devices in an IAB system in accordance with aspects of the present disclosure. The operations of method 1300 may be implemented by a first wireless device, which may be an example of an integrating device, relay base station 105, or UE 115, or its components as described herein. For example, the operations of method 1300 may be performed by an integrating device initial integration module as described with reference to FIGS. 5 through 8. In some examples, a first wireless device may execute a set of codes to control the functional elements of the device to perform the functions described below. Additionally or alternatively, the first wireless device may perform aspects of the functions described below using special-purpose hardware.

At 1305 the first wireless device may transmit, to a second wireless device in a beamformed transmission using a first beam pair link associated with a first quality level, an indication of a characteristic of the first wireless device. The operations of 1305 may be performed according to the methods described herein. In certain examples, aspects of the operations of 1305 may be performed by a characteristic indicator as described with reference to FIGS. 5 through 8.

At 1310 the first wireless device may perform beam training based on the characteristic of the first wireless device. The operations of 1310 may be performed according to the methods described herein. In certain examples, aspects of the operations of 1310 may be performed by a beam training component as described with reference to FIGS. 5 through 8.

At 1315 the first wireless device may establish, with the second wireless device, a second beam pair link associated with a second quality level greater than the first quality level based on the beam training. The operations of 1315 may be performed according to the methods described herein. In certain examples, aspects of the operations of 1315 may be performed by a beam pair link establishing component as described with reference to FIGS. 5 through 8.

Figure 14:
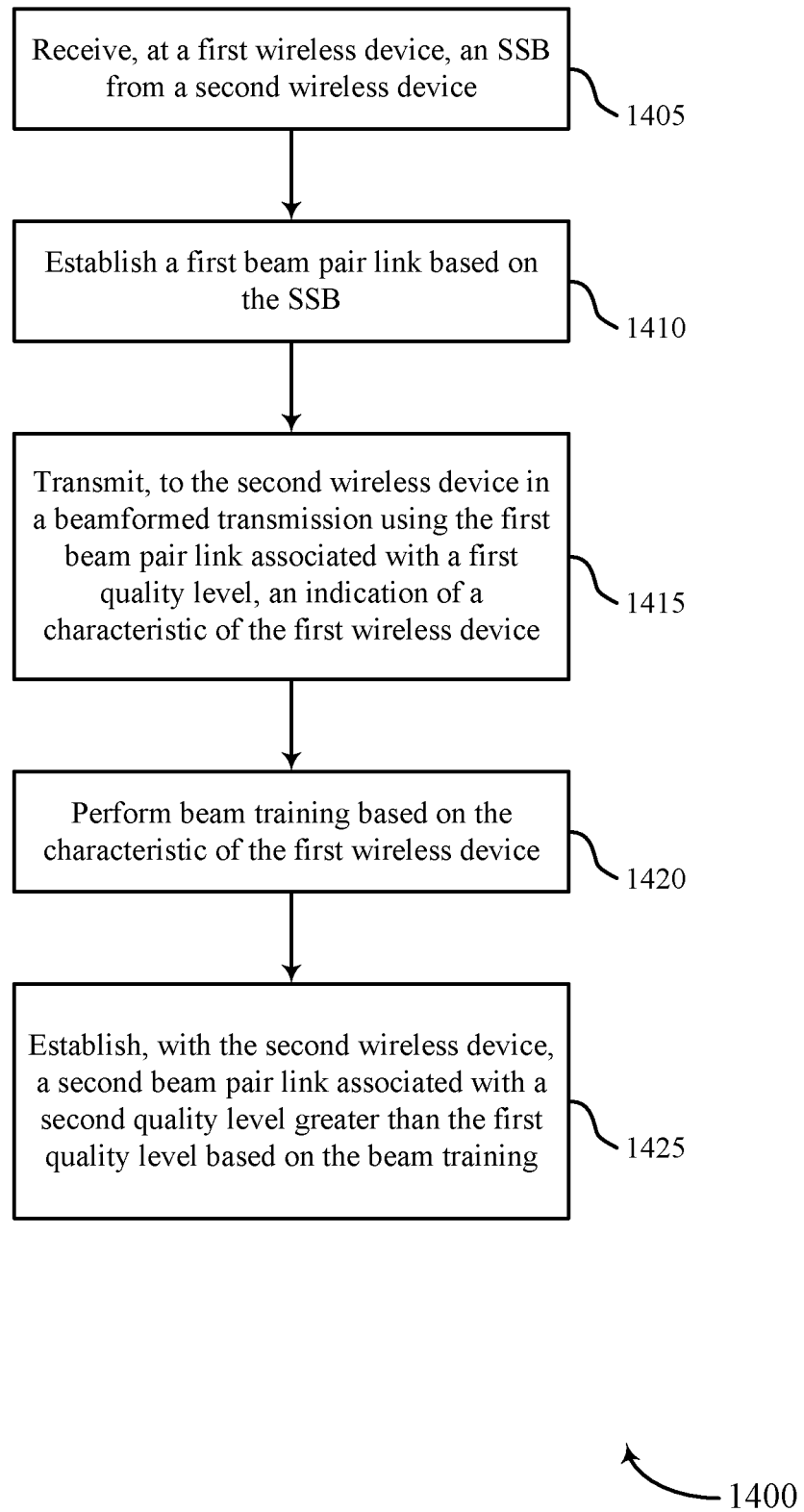

FIG. 14 shows a flowchart illustrating a method 1400 for initial integration of wireless devices in an IAB system in accordance with aspects of the present disclosure. The operations of method 1400 may be implemented by a first wireless device, which may be an example of an integrating device, relay base station 105, or UE 115, or its components as described herein. For example, the operations of method 1400 may be performed by an integrating device initial integration module as described with reference to FIGS. 5 through 8. In some examples, a first wireless device may execute a set of codes to control the functional elements of the device to perform the functions described below. Additionally or alternatively, the first wireless device may perform aspects of the functions described below using special-purpose hardware.

At 1405 the first wireless device may receive an SSB from a second wireless device. The operations of 1405 may be performed according to the methods described herein. In certain examples, aspects of the operations of 1405 may be performed by an SSB reception component as described with reference to FIGS. 5 through 8.

At 1410 the first wireless device may establish a first beam pair link based on the SSB. The operations of 1410 may be performed according to the methods described herein. In certain examples, aspects of the operations of 1410 may be performed by a beam pair link establishing component as described with reference to FIGS. 5 through 8.

At 1415 the first wireless device may transmit, to the second wireless device in a beamformed transmission using the first beam pair link associated with a first quality level, an indication of a characteristic of the first wireless device. The operations of 1415 may be performed according to the methods described herein. In certain examples, aspects of the operations of 1415 may be performed by a characteristic indicator as described with reference to FIGS. 5 through 8.

At 1420 the first wireless device may perform beam training based on the characteristic of the first wireless device. The operations of 1420 may be performed according to the methods described herein. In certain examples, aspects of the operations of 1420 may be performed by a beam training component as described with reference to FIGS. 5 through 8.

At 1425 the first wireless device may establish, with the second wireless device, a second beam pair link associated with a second quality level greater than the first quality level based on the beam training. The operations of 1425 may be performed according to the methods described herein. In certain examples, aspects of the operations of 1425 may be performed by a beam pair link establishing component as described with reference to FIGS. 5 through 8.

Figure 15:
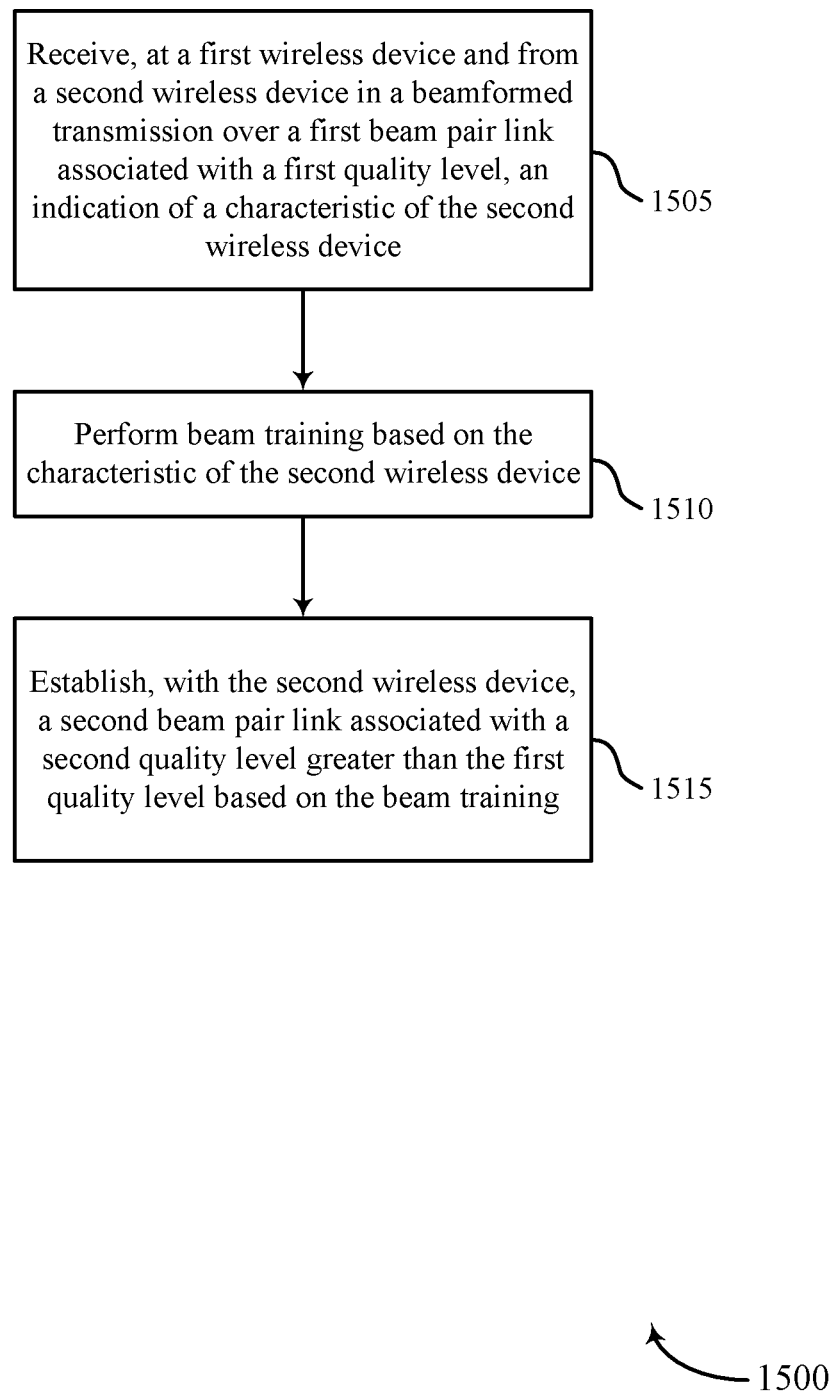

FIG. 15 shows a flowchart illustrating a method 1500 for initial integration of wireless devices in an IAB system in accordance with aspects of the present disclosure. The operations of method 1500 may be implemented by a first wireless device, which may be an example of a serving device, donor base station 105, relay base station 105, or UE 115, or its components as described herein. For example, the operations of method 1500 may be performed by a serving device initial integration module as described with reference to FIGS. 9 through 12. In some examples, a first wireless device may execute a set of codes to control the functional elements of the device to perform the functions described below. Additionally or alternatively, the first wireless device may perform aspects of the functions described below using special-purpose hardware.

At 1505 the first wireless device may receive, from a second wireless device in a beamformed transmission over a first beam pair link associated with a first quality level, an indication of a characteristic of the second wireless device. The operations of 1505 may be performed according to the methods described herein. In certain examples, aspects of the operations of 1505 may be performed by a characteristic reception component as described with reference to FIGS. 9 through 12.

At 1510 the first wireless device may perform beam training based on the characteristic of the second wireless device. The operations of 1510 may be performed according to the methods described herein. In certain examples, aspects of the operations of 1510 may be performed by a beam training component as described with reference to FIGS. 9 through 12.

At 1515 the first wireless device may establish, with the second wireless device, a second beam pair link associated with a second quality level greater than the first quality level based on the beam training. The operations of 1515 may be performed according to the methods described herein. In certain examples, aspects of the operations of 1515 may be performed by a beam pair link establishing component as described with reference to FIGS. 9 through 12.

Figure 16:
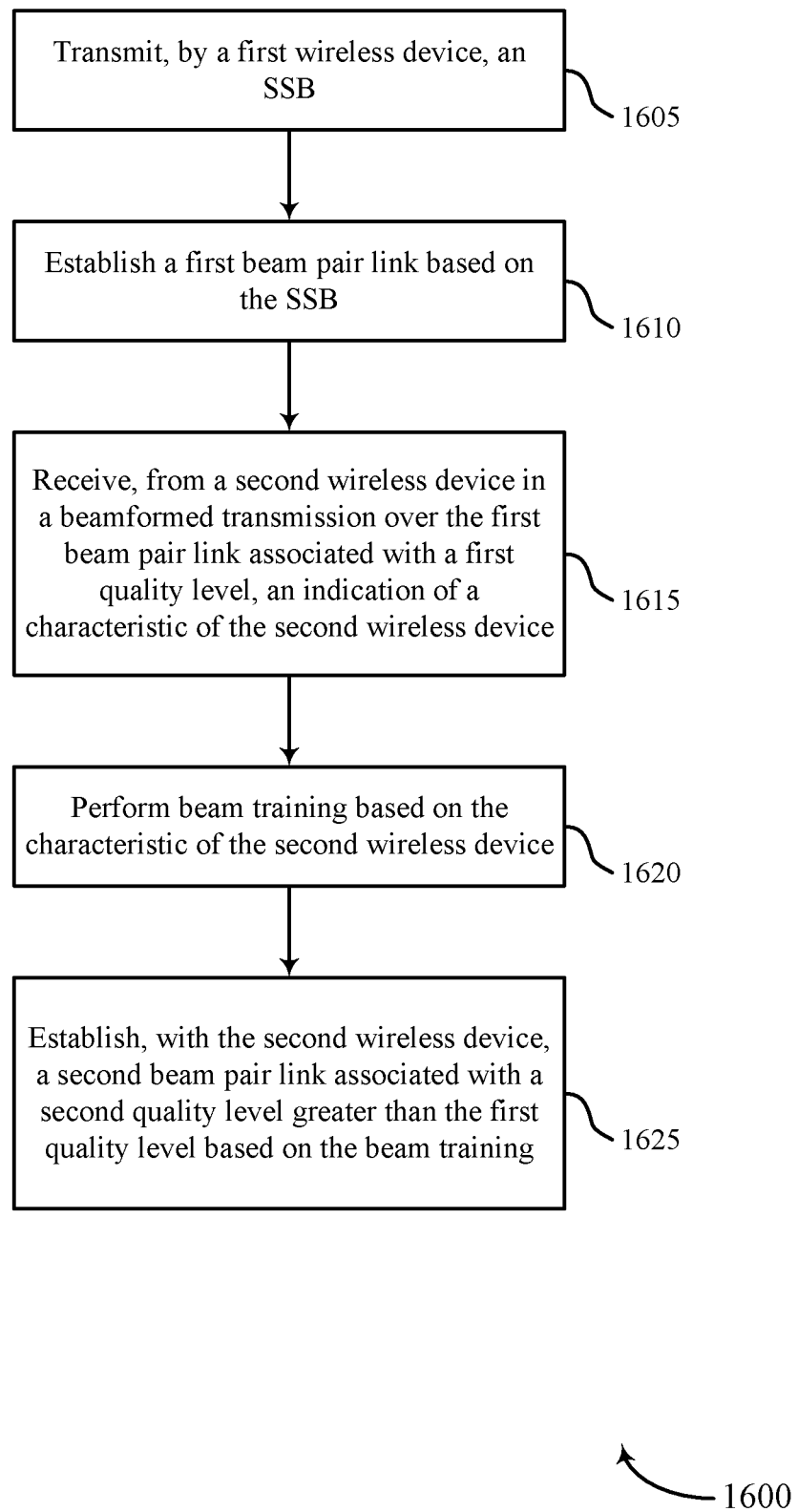

FIG. 16 shows a flowchart illustrating a method 1600 for initial integration of wireless devices in an IAB system in accordance with aspects of the present disclosure. The operations of method 1600 may be implemented by a first wireless device, which may be an example of a serving device, donor base station 105, relay base station 105, or UE 115, or its components as described herein. For example, the operations of method 1600 may be performed by a serving device initial integration module as described with reference to FIGS. 9 through 12. In some examples, a first wireless device may execute a set of codes to control the functional elements of the device to perform the functions described below. Additionally or alternatively, the first wireless device may perform aspects of the functions described below using special-purpose hardware.

At 1605 the first wireless device may transmit an SSB. The operations of 1605 may be performed according to the methods described herein. In certain examples, aspects of the operations of 1605 may be performed by an SSB transmission component as described with reference to FIGS. 9 through 12.

At 1610 the first wireless device may establish a first beam pair link based on the SSB. The operations of 1610 may be performed according to the methods described herein. In certain examples, aspects of the operations of 1610 may be performed by a beam pair link establishing component as described with reference to FIGS. 9 through 12.

At 1615 the first wireless device may receive, from a second wireless device in a beamformed transmission over the first beam pair link associated with a first quality level, an indication of a characteristic of the second wireless device. The operations of 1615 may be performed according to the methods described herein. In certain examples, aspects of the operations of 1615 may be performed by a characteristic reception component as described with reference to FIGS. 9 through 12.

At 1620 the first wireless device may perform beam training based on the characteristic of the second wireless device. The operations of 1620 may be performed according to the methods described herein. In certain examples, aspects of the operations of 1620 may be performed by a beam training component as described with reference to FIGS. 9 through 12.

At 1625 the first wireless device may establish, with the second wireless device, a second beam pair link associated with a second quality level greater than the first quality level based on the beam training. The operations of 1625 may be performed according to the methods described herein. In certain examples, aspects of the operations of 1625 may be performed by a beam pair link establishing component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first wireless device, comprising:
   receiving a synchronization signal block (SSB) from a second wireless device and establishing a first beam pair link based at least in part on the SSB wherein the SSB is received according to a first reference signal received power (RSRP) threshold that is less than a second RSRP threshold associated with a user equipment (UE);
   transmitting, from the first wireless device to the second wireless device in a beamformed transmission using the first beam pair link associated with a first quality level, an indication of a characteristic of the first wireless device;
   performing beam training based at least in part on the characteristic of the first wireless device; and establishing, with the second wireless device, a second beam pair link associated with a second quality level greater than the first quality level based at least in part on the beam training.

2. The method of claim 1, wherein receiving the SSB comprises:
receiving the SSB in at least one beam during a reception beam-sweeping procedure.

3. The method of claim 1, wherein the first RSRP threshold is configured based at least in part on the second RSRP threshold and a conversion value or is configured to a default value independent of the second RSRP threshold.

4. The method of claim 3, wherein the default value is equal to zero.

5. The method of claim 1, further comprising:
configuring the first RSRP threshold according to a received master information block (MIB), system information block (SIB), remaining minimum system information (RMSI), other system information (OSI), non-standalone (NSA) message, or a combination thereof.

6. The method of claim 1, further comprising:
transmitting a random access (RACH) preamble message over the first beam pair link.

7. The method of claim 6, wherein the RACH preamble message comprises the indication of the characteristic of the first wireless device.

8. The method of claim 7, further comprising:
selecting a RACH preamble sequence or resources for the RACH preamble message based at least in part on the characteristic of the first wireless device.

9. The method of claim 6, further comprising:
transmitting one or more RACH preamble message retransmissions according to a first maximum RACH preamble transmission threshold that is greater than a second maximum RACH preamble transmission threshold associated with a user equipment (UE).

10. The method of claim 9, wherein the first maximum RACH preamble transmission threshold is configured based at least in part on the second maximum RACH preamble transmission threshold and a conversion value or is configured to a default value independent of the second maximum RACH preamble transmission threshold.

11. The method of claim 9, further comprising:
configuring the first maximum RACH preamble transmission threshold according to a received master information block (MIB), system information block (SIB), remaining minimum system information (RMSI), other system information (OSI), non-standalone (NSA) message, or a combination thereof.

12. The method of claim 9, further comprising:
performing power ramping for the one or more RACH preamble message retransmissions, wherein a first power ramping step for the power ramping is greater than a second power ramping step associated with the UE.

13. The method of claim 6, wherein the RACH preamble message is transmitted according to a first target received power threshold that is greater than a second target received power threshold associated with a user equipment (UE).

14. The method of claim 1, wherein transmitting the indication of the characteristic of the first wireless device comprises:
transmitting a device identification message comprising the indication of the characteristic of the first wireless device, and the device identification message comprises a random access (RACH) Message 3 (Msg3) transmission.

15. The method of claim 1, wherein the characteristic of the first wireless device comprises a physical location of the first wireless device, an elevation of the first wireless device, a global positioning system (GPS) location of the first wireless device, a class or category of the first wireless device corresponding to integration capabilities of the first wireless device, or a combination thereof.

16. The method of claim 1, wherein:
the first quality level corresponds to a first reference signal received power (RSRP) metric;
the second quality level corresponds to a second RSRP metric greater than the first RSRP metric; and
the second beam pair link comprises narrower beams than the first beam pair link.

17. The method of claim 1, wherein transmitting the indication of the characteristic of the first wireless device comprises:
transmitting a layer one (L1) reference signal, a medium access control channel element (MAC-CE), a radio resource control (RRC) message, an upper-layer message, or a combination thereof comprising the indication of the characteristic of the first wireless device.

18. The method of claim 1, wherein:
the first wireless device comprises a relay base station; and
the second wireless device comprises a donor base station or a different relay base station.

19. A method for wireless communications at a first wireless device, comprising:
transmitting a synchronization signal block (SSB) and establishing a first beam pair link based at least in part on the SSB;
receiving, from a second wireless device in a beamformed transmission over the first beam pair link associated with a first quality level, an indication of a characteristic of the second wireless device;
performing beam training based at least in part on the characteristic of the second wireless device;
establishing, with the second wireless device, a second beam pair link associated with a second quality level greater than the first quality level based at least in part on the beam training; and
transmitting a plurality of SSBs, wherein each SSB of the plurality of SSBs is transmitted on a different beam in a transmission beam-sweeping procedure, and the transmission beam-sweeping procedure for the second wireless device comprises a first set of beams different than a second set of beams associated with a transmission beam-sweeping procedure for user equipment (UE) access.

20. The method of claim 19, further comprising:
receiving a random access (RACH) preamble message over the first beam pair link, wherein the RACH preamble message comprises the indication of the characteristic of the second wireless device.

21. The method of claim 19, further comprising:
receiving a device identification message over the first beam pair link, wherein the device identification message comprises the indication of the characteristic of the second wireless device, and the device identification message comprises a random access (RACH) Message 3 (Msg3) transmission.

22. The method of claim 19, wherein the characteristic of the second wireless device comprises a physical location of the second wireless device, an elevation of the second wireless device, a global positioning system (GPS) location of the second wireless device, a class or category of the second wireless device corresponding to integration capabilities of the second wireless device, or a combination thereof.

23. The method of claim 19, wherein:
the first quality level corresponds to a first reference signal received power (RSRP) metric;
the second quality level corresponds to a second RSRP metric greater than the first RSRP metric; and
the second beam pair link comprises narrower beams than the first beam pair link.

24. The method of claim 19, further comprising:
receiving a layer one (L1) reference signal, a medium access control channel element (MAC-CE), a radio resource control (RRC) message, an upper-layer message, or a combination thereof comprising the indication of the characteristic of the second wireless device.

25. An apparatus for wireless communications at a first wireless device, comprising:
a processor;
memory in electronic communication with the processor; and
instructions stored in the memory and executable by the processor to cause the apparatus to:
receive a synchronization signal block (SSB) from a second wireless device and establishing a first beam pair link based at least in part on the SSB wherein the SSB is received according to a first reference signal received power (RSRP) threshold that is less than a second RSRP threshold associated with a user equipment (UE);
transmit, to a second wireless device in a beamformed transmission using a first beam pair link associated with a first quality level, an indication of a characteristic of the first wireless device;
perform beam training based at least in part on the characteristic of the first wireless device; and
establish, with the second wireless device, a second beam pair link associated with a second quality level greater than the first quality level based at least in part on the beam training.

26. An apparatus for wireless communications at a first wireless device, comprising:
a processor;
memory in electronic communication with the processor; and
instructions stored in the memory and executable by the processor to cause the apparatus to:
transmit a synchronization signal block (SSB) and establishing a first beam pair link based at least in part on the SSB;
receive, from a second wireless device in a beamformed transmission over the first beam pair link associated with a first quality level, an indication of a characteristic of the second wireless device;
perform beam training based at least in part on the characteristic of the second wireless device;
establish, with the second wireless device, a second beam pair link associated with a second quality level greater than the first quality level based at least in part on the beam training; and
transmit a plurality of SSBs, wherein each SSB of the plurality of SSBs is transmitted on a different beam in a transmission beam-sweeping procedure, and the transmission beam-sweeping procedure for the second wireless device comprises a first set of beams different than a second set of beams associated with a transmission beam-sweeping procedure for user equipment (UE) access.

27. The apparatus of claim 25, wherein the instructions stored in the memory and executable by the processor to cause the apparatus to:
receive the SSB in at least one beam during a reception beam-sweeping procedure.

28. The apparatus of claim 25 wherein the first RSRP threshold is configured based at least in part on the second RSRP threshold and a conversion value or is configured to a default value independent of the second RSRP threshold.

29. The apparatus of claim 26, wherein the instructions stored in the memory and executable by the processor to cause the apparatus to:
receive a random access (RACH) preamble message over the first beam pair link, wherein the RACH preamble message comprises the indication of the characteristic of the second wireless device.

30. The apparatus of claim 26, wherein the instructions stored in the memory and executable by the processor to cause the apparatus to:
receive a device identification message over the first beam pair link, wherein the device identification message comprises the indication of the characteristic of the second wireless device, and the device identification message comprises a random access (RACH) Message 3 (Msg3) transmission.

* * * * *